United States Patent
Kang et al.

(10) Patent No.: US 10,614,776 B2
(45) Date of Patent: Apr. 7, 2020

(54) ELECTRONIC DEVICE AND OPERATION METHOD THEREOF

(71) Applicant: Samsung Electronics Co., Ltd., Gyeonggi-do (KR)

(72) Inventors: Hyunjoo Kang, Gyeonggi-do (KR); Tae-Young Kang, Seoul (KR); Jaeyeon Rho, Seoul (KR); Yongsoung Lee, Seoul (KR); Chang-Youl Lee, Seoul (KR); Tae-Young Ha, Seoul (KR); Sujin Park, Seoul (KR); Kihyun Yoon, Seoul (KR); In-Don Ju, Seoul (KR); Jaemo Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/065,988

(22) PCT Filed: Dec. 13, 2016

(86) PCT No.: PCT/KR2016/014564
§ 371 (c)(1),
(2) Date: Jun. 25, 2018

(87) PCT Pub. No.: WO2017/111373
PCT Pub. Date: Jun. 29, 2017

(65) Prior Publication Data
US 2018/0374451 A1    Dec. 27, 2018

(30) Foreign Application Priority Data
Dec. 24, 2015 (KR) .................. 10-2015-0186484

(51) Int. Cl.
G09G 5/10     (2006.01)
G06F 3/147    (2006.01)
G06F 3/14     (2006.01)

(52) U.S. Cl.
CPC ............... G09G 5/10 (2013.01); G06F 3/147 (2013.01); G06F 3/1423 (2013.01);
(Continued)

(58) Field of Classification Search
CPC combination set(s) only.
See application file for complete search history.

(56) References Cited

U.S. PATENT DOCUMENTS 8,890,771 B2    11/2014  Pance
2013/0265232 A1*  10/2013  Yun ..................... G09G 3/3208
                                                    345/158

(Continued)

FOREIGN PATENT DOCUMENTS

JP    2014503835    2/2014
KR    101181740     9/2012

(Continued)

OTHER PUBLICATIONS

PCT/ISA/210 Search Report issued on PCT/KR2016/014564 (pp. 3).
PCT/ISA/237 Written Opinion issued on PCT/KR2016/014564 (pp. 7).

*Primary Examiner* — Wesner Sajous
(74) *Attorney, Agent, or Firm* — The Farrell Law Firm, P.C.

(57) ABSTRACT

Disclosed are an electronic device and an operation method thereof according to various embodiment, the method comprising: reproducing first content on a first display unit having variable transparency; detecting an object in response to the first display unit; controlling transparency in at least a partial area of the first display unit on the basis of the object; and reproducing second content on a second display unit, disposed to be spaced from the first display unit.

16 Claims, 34 Drawing Sheets

(52) U.S. Cl.
 CPC . *G09G 2320/0686* (2013.01); *G09G 2340/10* (2013.01); *G09G 2354/00* (2013.01); *G09G 2370/06* (2013.01); *G09G 2380/04* (2013.01)

(56) References Cited

U.S. PATENT DOCUMENTS

| | | | |
|---|---|---|---|
| 2014/0282159 A1* | 9/2014 | Lee | G06F 3/0481 |
| | | | 715/768 |
| 2015/0205451 A1 | 7/2015 | Lee | |
| 2015/0220299 A1* | 8/2015 | Kim | G06F 3/0488 |
| | | | 345/1.3 |
| 2016/0202786 A1 | 7/2016 | Lee et al. | |
| 2016/0234464 A1* | 8/2016 | Loce | G06K 9/00711 |
| 2017/0139496 A1* | 5/2017 | Kang | G06F 3/041 |
| 2017/0148376 A1* | 5/2017 | Yoo | G09G 3/2092 |

FOREIGN PATENT DOCUMENTS

| | | |
|---|---|---|
| KR | 1020130089406 | 8/2013 |
| KR | 1020130113902 | 10/2013 |
| KR | 101471412 | 12/2014 |
| KR | 1020150088084 | 7/2015 |
| KR | 1020150093090 | 8/2015 |

\* cited by examiner

ELECTRONIC DEVICE AND OPERATION METHOD THEREOF

PRIORITY

This application is a National Phase Entry of PCT International Application No. PCT/KR2016/014564, which was filed on Dec. 13, 2016, and claims priority to Korean Patent Application No. 10-2015-0186484, which was filed on Dec. 24, 2015, the contents of each of which are incorporated herein by reference.

TECHNICAL FIELD

Various embodiments relate to an electronic device and an operation method thereof.

BACKGROUND ART

Generally, display windows are installed so that an item displayed therein can be seen from the outside. To this end, a display window is formed using a transparent glass wall. For example, display windows can be installed in a shop, a department store, an art gallery, a museum, and the like. Such display windows are intended to display goods and to draw people's attention. For this reason, a manager may change the arrangement of items in a display window in order to effectively draw people's attention.

DETAILED DESCRIPTION OF THE INVENTION

Technical Problem

However, the foregoing display windows have limitation in drawing people's attention, because the display windows do not respond to humans and do not provide various interactions. Thus, the display windows have low efficiency.

Technical Solution

An operation method of an electronic device according to various embodiments may include: playing first content on a first display unit having variable transparency; sensing an object corresponding to the first display unit; adjusting the transparency of at least a portion of the first display unit on the basis of the object; and playing second content on a second display unit that is spaced apart from the first display unit.

An electronic device according to various embodiments may include: a first display unit having variable transparency; a second display unit that is spaced apart from the first display unit; and a controller that is functionally connected to the first display unit and the second display unit.

According to various embodiments, the controller may be configured to: play first content on the first display unit; sense an object corresponding to the first display unit; adjust the transparency of at least a portion of the first display unit on the basis of the object; and play second content on the second display unit.

Advantageous Effects

According to various embodiments, an electronic device may provide various interactions using a first display unit having variable transparency. That is, the electronic device may provide various interactions in response to an object through the first display unit. Accordingly, the electronic device may efficiently draw people's attention. In addition, the electronic device may highlight an item through a second display unit. Accordingly, the electronic device may effectively display the item.

MODE FOR CARRYING OUT THE INVENTION

Figure 1:
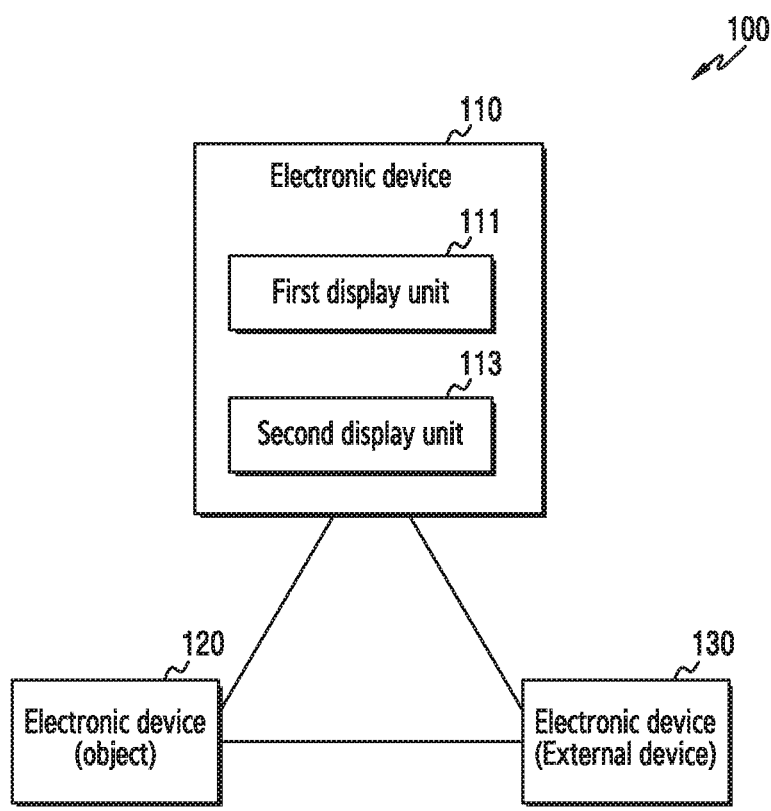
FIG. 1 is a block diagram illustrating a communication system according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context.

As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

Figure 2:
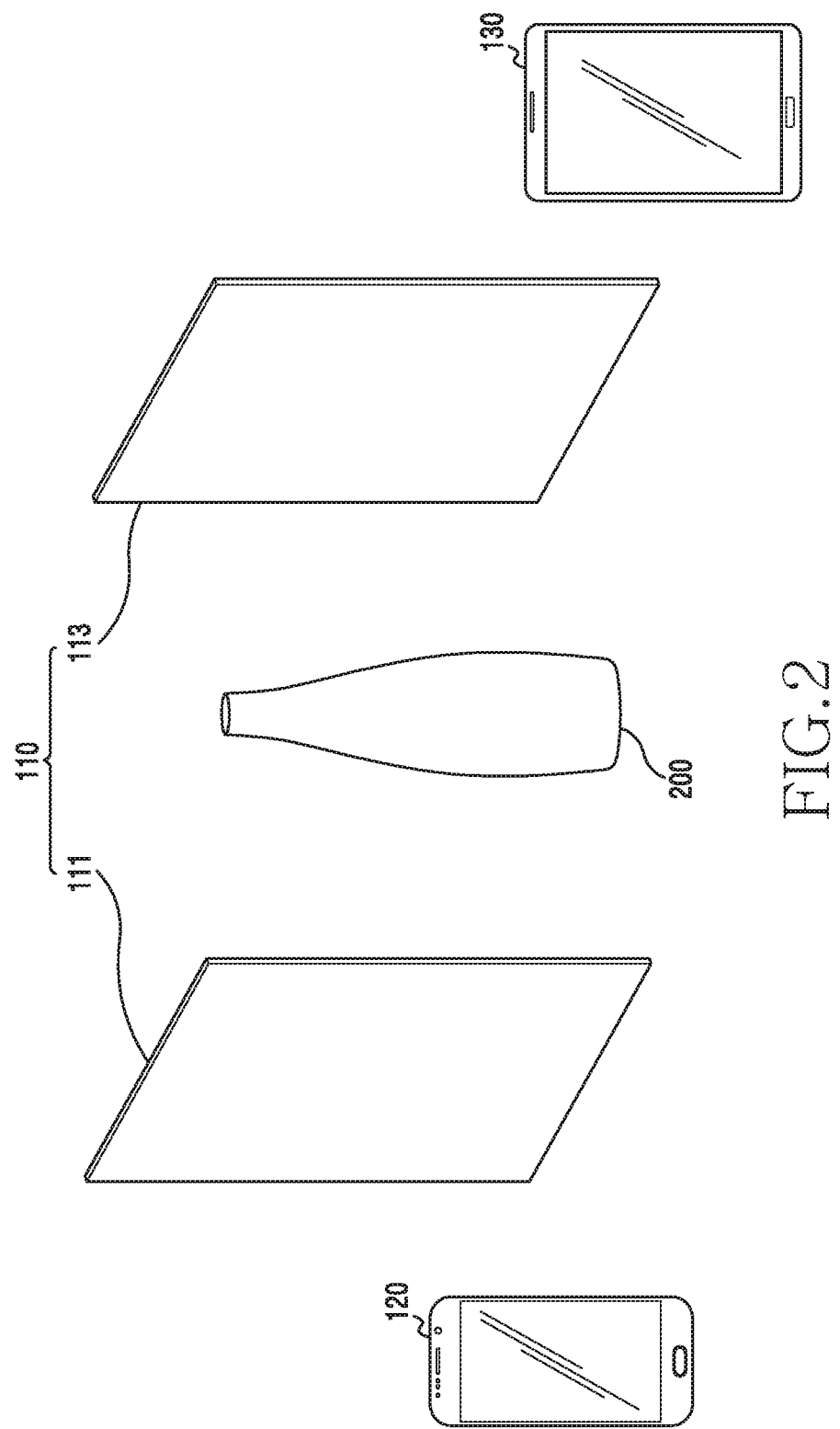
FIG. 2 illustrates an example of a communication system according to various embodiments.

FIG. 1 is a block diagram illustrating a communication system 100 according to various embodiments. FIG. 2 illustrates an example of a communication system 100 according to various embodiments.

Referring to FIG. 1, the communication system 100 according to various embodiments may include a plurality of electronic devices 110, 120, and 130. The electronic devices 110, 120, and 130 may be different types of devices, and at least two of the electronic devices 110, 120, and 130 may be the same type of devices. The electronic devices 110, 120, and 130 may be connected to each other and may communicate with each other. The electronic devices 110, 120, and 130 may include a first electronic device 110, a second electronic device 120, and a third electronic device 130.

The first electronic device 110 may operate at a predetermined location. The first electronic device 110 may have a function of displaying an item 200 as shown in FIG. 2. Here, the item 200 may be a physical object having a certain shape and may include, for example, a work or art, a commodity, a product, and the like. In addition, the first electronic device 110 may have a function of attracting people's attention and leading people to an object. For example, the object may include at least a portion of a human body or the second electronic device 120. Further, the first electronic device 110 may have a function of providing information about the item 200 to the object.

To this end, the first electronic device 110 may include at least two display units 111, 113. In this case, the display units 111 and 113 may include a first display unit 111 and a second display unit 113. The first display unit 111 and the second display unit 113 may be spaced apart from each other. Here, a first direction and a second direction may be defined based on the first display unit 111. For example, the first direction may be the front of the first display unit 111, and the second direction may be the rear of the first display unit 111. The second display unit 113 may be disposed at the rear of the first display unit 111. For example, the first display unit 111 and the second display unit 113 may be disposed side by side and may be disposed to incline to each other. Accordingly, a space may be formed between the first display unit 111 and the second display unit 113, and the item 200 may be positioned in the space. The first display unit 111 may have variable transparency. The object may be positioned in front of the first electronic device 110. For example, the object may approach the first electronic device 110 in front of the first electronic device 110 and may be positioned or move in front of the first electronic device 110.

According to various embodiments, the first electronic device 110 may play first content on the first display unit 111 and may play second content on the second display unit 113. Here, the first content and the second content may include at least one any of image data and audio data. Here, the first electronic device 110 may operate the first display unit 111 and the second display unit 113 at a time interval. For example, the first electronic device 110 may play the first content on the first display unit 111. Accordingly, the object may view the first content in the first direction of the first display unit 111. The first electronic device 110 may display the item 200 by increasing the transparency of the first display unit 111. Here, the first electronic device 110 may increase the transparency of at least a portion of the first display unit 111 according to the approach of the object. Accordingly, the object may view the first content and the item 200 in the first direction of the first display unit 111. In addition, the first electronic device 110 may play the second content on the second display unit 113 as the background for the item 200, thereby emphasizing the item 200. Accordingly, the object may view the item 200 in the first direction of the first display unit 111 with the second content in the background.

The second electronic device 120 may operate with mobility. That is, the second electronic device 120 may be carried and moved by the user. The second electronic device 120 may receive various pieces of information from the first electronic device 110 or the third electronic device 130. The second electronic device 120 may receive information on the item 200 from the first electronic device 110 or the third electronic device 130. In the present document, the term "user" may refer to a person using the second electronic device 120 or the second electronic device 120 and may be used interchangeably with the term "object". For example, the second electronic device 120 may include at least one of a smartphone, a tablet PC, a mobile phone, a video phone, an electronic book reader, a netbook computer, a Portable Multimedia Player (PMP), an MP3 player, a medical device, a camera, and a wearable device. The wearable device may include at least one of an accessory type (e.g., a watch, a ring, a bracelet, an anklet, a necklace, glasses, a contact lens, or a Head-Mounted Device (HMD)), a fabric or clothing integrated type (e.g., electronic clothing), a body-mounted type (e.g., a skin pad or tattoo), and a bio-implantable circuit.

The third electronic device 130 may operate at a predetermined location. Alternatively, the third electronic device 130 may operate with mobility. That is, the third electronic device 130 may be operated by an administrator. Here, the third electronic device 130 may be carried and moved by the administrator. The third electronic device 130 may provide various pieces of information to the first electronic device 110 or the second electronic device 120. The third electronic device 130 may transmit information on the item 200 to the first electronic device 110 or the second electronic device 120. In the present document, the term "administrator" may refer to a person using the third electronic device 130 or the third electronic device 130 and may be used interchangeably with the term "external device". For example, the second electronic device 120 may include at least one of a smartphone, a tablet PC, a mobile phone, a video phone, an electronic book reader, a desktop PC, a laptop PC, a netbook computer, a work station, a server, a Portable Multimedia Player (PMP), an MP3 player, a medical device, a camera, and a wearable device. The wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad or tattoo), and a bio-implantable circuit.

Figure 3:
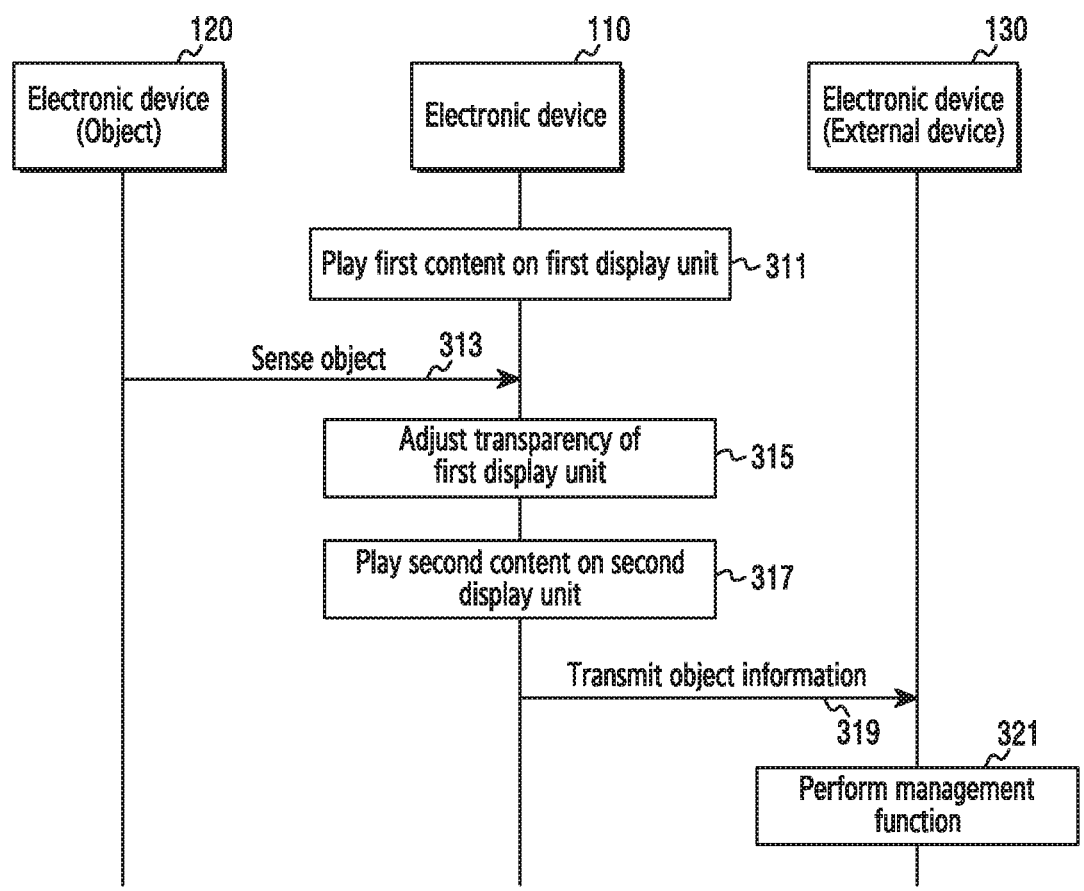
FIG. 3 is a flowchart illustrating signal flow in a communication system according to various embodiments.

FIG. 3 is a flowchart illustrating signal flow in the communication system 100 according to various embodiments. FIGS. 6A, 6B, 6C, and 6D illustrate examples of the signal flow in the communication system 100 according to various embodiments.

Referring to FIG. 3, in the communication system 100 according to various embodiments, the first electronic device 110 may play first content on the first display unit 111 in operation 311. For example, the first content may include at least any one of image data or audio data. Here, the first display unit 111 may have variable transparency. To this end, the first electronic device 110 may decrease the transparency of the first display unit 111. For example, the first electronic device 110 may set the first display unit 111 to an opaque state.

In operation 313, the first electronic device 110 may sense an object. Here, the first electronic device 110 may sense the approach of the object. That is, the first electronic device 110 may detect the object within a preset radius. For example, the first electronic device 110 may capture image data. The first electronic device 110 may compare the size of the object in the image data with a preset threshold value, thereby sensing the approach of the object. Alternatively, the first electronic device 110 may collect audio signals. The first electronic device 110 may compare the voice of the object in the audio signals with a preset threshold value, thereby sensing the approach of the object. Alternatively, the first electronic device 110 may sense the movement of the object. Alternatively, the first electronic device 110 may sense the heat of the object.

In operation 315, the first electronic device 110 may adjust the transparency of the first display unit 111. Here, the first electronic device 110 may increase the transparency of at least a portion of the first display unit 111. Here, the first electronic device 110 may determine the portion of the first display unit 111 as a transparent area on the basis of the location of the object. The first electronic device 110 may increase the transparency of the portion of the first display unit 111. For example, the first electronic device 110 may change the portion of the first display unit 111 to a transparent state. In addition, the first electronic device 110 may move the transparent area in the first display unit 111 according to the movement of the object. For example, the first electronic device 110 may change the portion of the first display unit 111 to an opaque state and may change another portion of the first display unit 111 to a transparent state.

In operation 317, the first electronic device 110 may play second content on the second display unit 113. For example, the second content may include at least any one of image data and audio data. To this end, the first electronic device 110 may turn on the second display unit 113. For example, when the transparency of the entire area of the first display unit 111 is increased, the first electronic device 110 may play the second content on the second display unit 113.

In operation 319, the first electronic device 110 may transmit object information on the object to the third electronic device 130. To this end, the first electronic device 110 may analyze the object and may detect the object information. For example, the object information may include at least any one of item information on a predetermined item 200, the approach time of the object, and a feature of the object. The approach time of the object may include approach start time and an approach retention period. The feature of the object may include at least any one of the age, gender, race, and personality of the object and may be detected from at least any one of image data on the object, an audio signal of the object, a movement of the object, and the heat of the object.

In operation 321, the third electronic device 130 may perform a management function on the basis of the object information. That is, the third electronic device 130 may analyze the object information and may perform the management function. Here, the third electronic device 130 may compile statistics from the object information corresponding to each object and may also compile statistics from object information corresponding to a plurality of objects. The third electronic device 130 may manage a website.

Figure 6A:
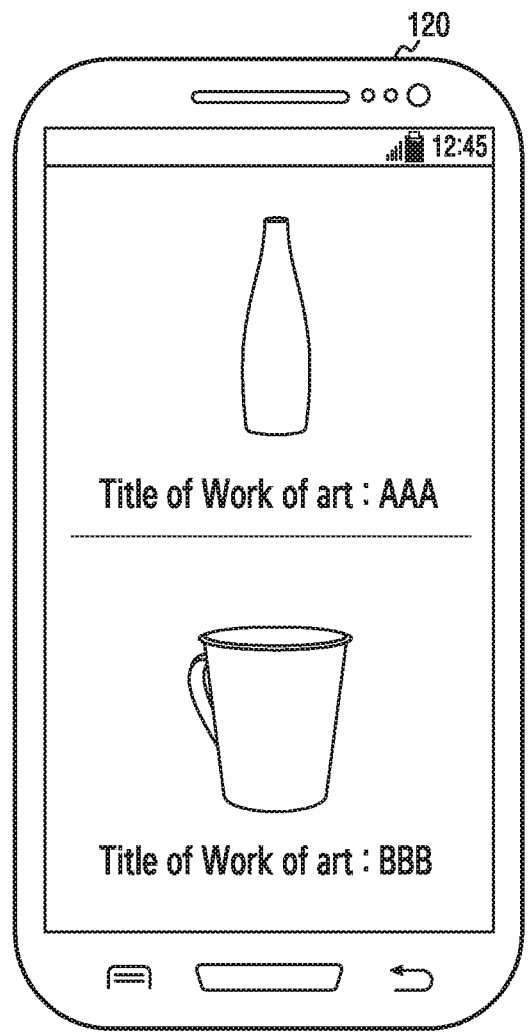
FIGS. 6A, 6B, 6C, and 6D illustrate examples of signal flow in a communication system according to various embodiments.
Figure 6B:
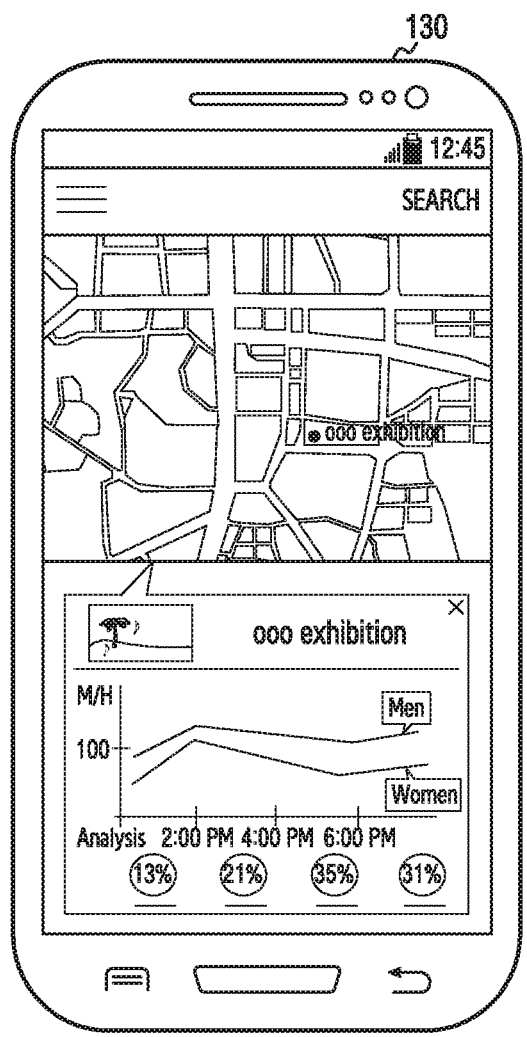
Figure 6C:
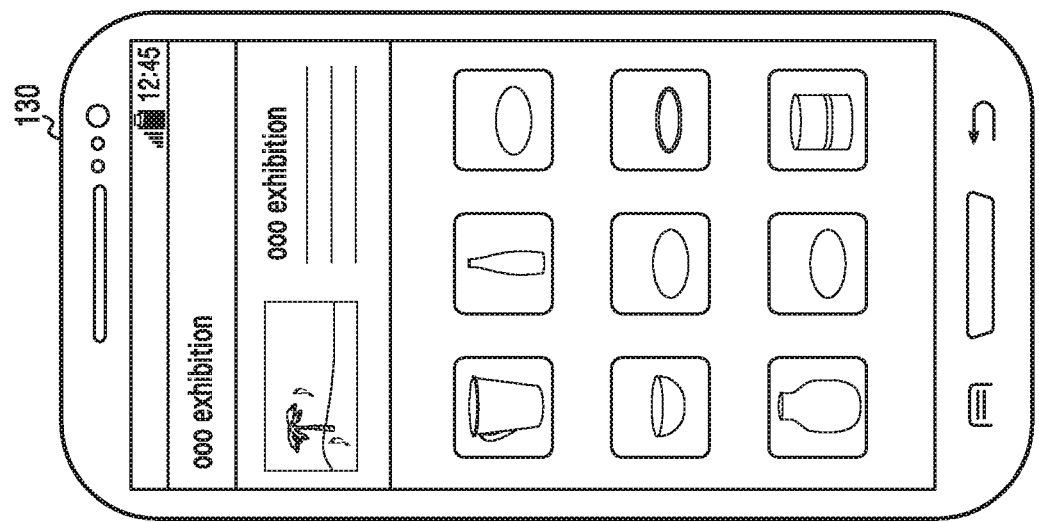
Figure 6C:
Figure 6C:
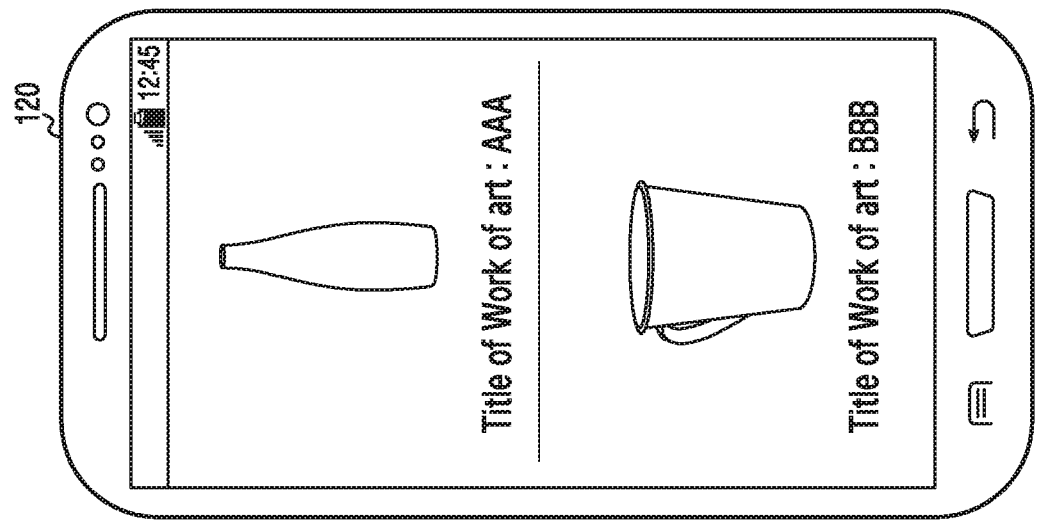
Figure 6D:
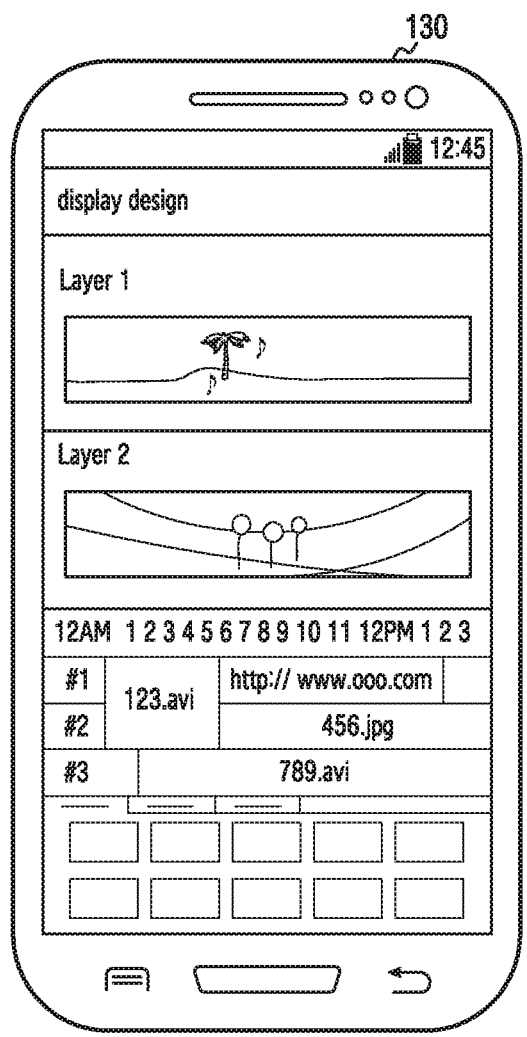

For example, as illustrated in FIG. 6A, the third electronic device 130 may provide notification information on the item 200 for each object via the website. Accordingly, even though the object is located remotely from the first electronic device 110, the object may identify the notification information on the item 200 via the second electronic device 120. Further, as illustrated in FIG. 6B, the third electronic device 130 may determine and provide at least any one of location information, preference information, and ranking information on the item 200 through the website. Accordingly, the item 200 to be applied to the first electronic device 110 may be determined according to at least any one of the preference information and the ranking information on the item 200. Also, as illustrated in FIG. 6C, the third electronic device 130 may provide notification information on the item 200 for each object to the second electronic device 120. In addition, as illustrated in FIG. 6D, the third electronic device 130 may design a management solution for the first electronic device 110. For example, the third electronic device 130 may effectively determine the first content and the second content corresponding to the item 200.

Figure 4:
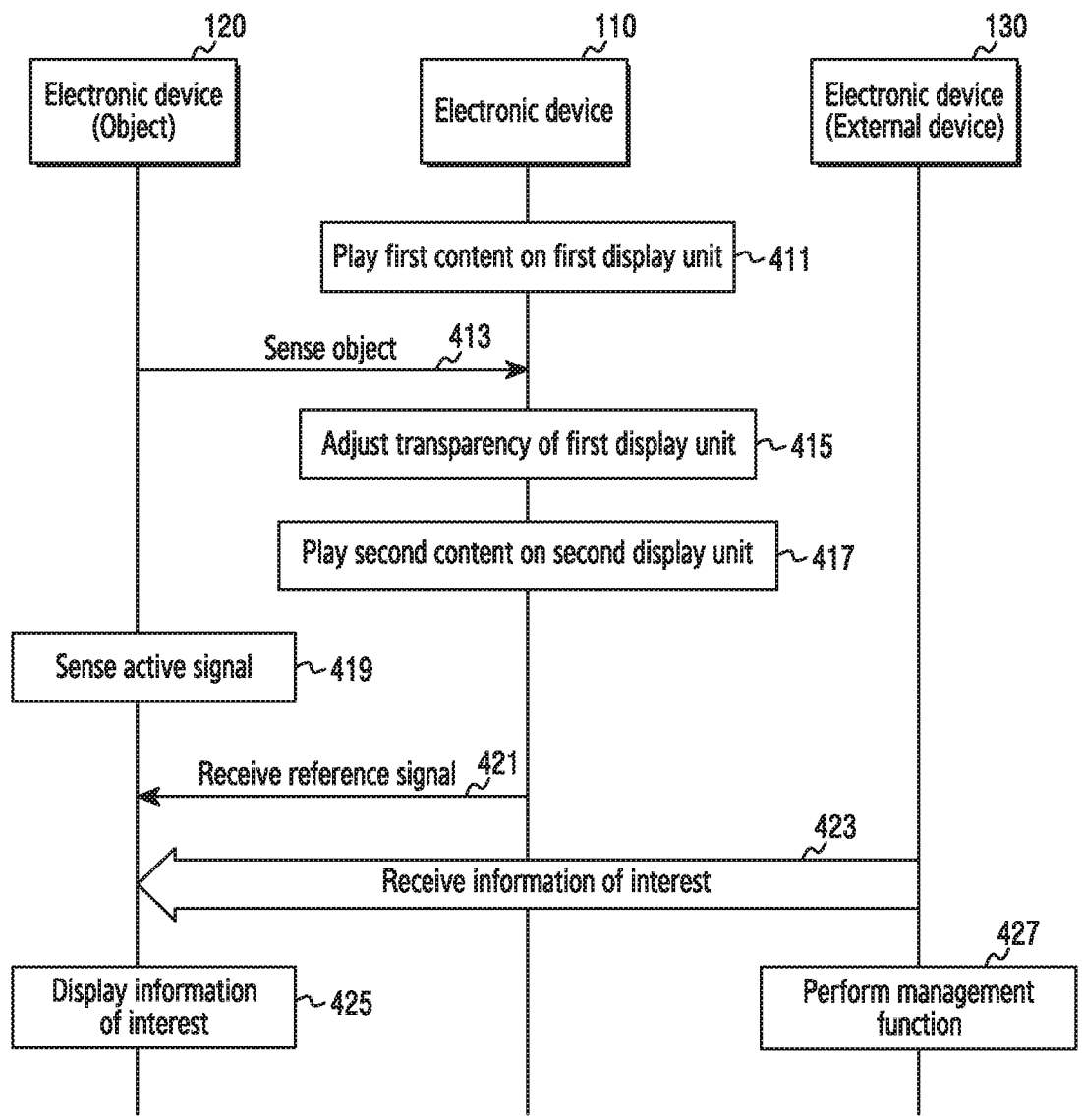
FIG. 4 is a flowchart illustrating signal flow in a communication system according to various embodiments.

FIG. 4 is a flowchart illustrating signal flow in the communication system 100 according to various embodiments. FIGS. 6A, 6B, 6C, and 6D illustrate examples of the signal flow in the communication system according to various embodiments.

Referring to FIG. 4, in the communication system 100 according to various embodiments, the first electronic device 110 may play first content on the first display unit 111 in operation 411. For example, the first content may include at least any one of image data and audio data. Here, the first display unit 111 may have variable transparency. To this end, the first electronic device 110 may decrease the transparency of the first display unit 111. For example, the first electronic device 110 may set the first display unit 111 to an opaque state.

In operation 413, the first electronic device 110 may sense an object. Here, the first electronic device 110 may sense the approach of the object. That is, the first electronic device 110 may detect the object within a preset radius. For example, the first electronic device 110 may capture image data. The first electronic device 110 may compare the size of the object in the image data with a preset threshold value, thereby sensing the approach of the object. Alternatively, the first electronic device 110 may collect audio signals. The first electronic device 110 may compare the voice of the object in the audio signals with a preset threshold value, thereby sensing the approach of the object. Alternatively, the first electronic device 110 may sense the movement of the object. Alternatively, the first electronic device 110 may sense the heat of the object.

In operation 415, the first electronic device 110 may adjust the transparency of the first display unit 111. Here, the first electronic device 110 may increase the transparency of at least a portion of the first display unit 111. Here, the first electronic device 110 may determine the portion of the first display unit 111 as a transparent area on the basis of the location of the object. The first electronic device 110 may increase the transparency of the portion of the first display unit 111. For example, the first electronic device 110 may change the portion of the first display unit 111 to a transparent state. In addition, the first electronic device 110 may move the transparent area in the first display unit 111 according to the movement of the object. For example, the first electronic device 110 may change the portion of the first display unit 111 to an opaque state and may change another portion of the first display unit 111 to a transparent state.

In operation 417, the first electronic device 110 may play second content on the second display unit 113. For example, the second content may include at least any one of image data and audio data. To this end, the first electronic device 110 may turn on the second display unit 113. For example, when the transparency of the entire area of the first display unit 111 is increased, the first electronic device 110 may play the second content on the second display unit 113.

In operation 419, the second electronic device 120 may sense an active signal. Here, when the second electronic device 120 is turned on, the second electronic device 120 may sense the active signal regardless of the current state. For example, the second electronic device 120 can sense the active signal in a normal-power state and can also sense the active signal in a low-power state. Further, the second electronic device 120 can sense the active signal in a display-on state and can also sense the active signal in a display-off state. For example, the active signal may include at least any one of an acoustic signal and a movement signal. The acoustic signal may be generated when the second electronic device 120 is tapped, and the second electronic device may detect the acoustic signal as an active signal by comparing the acoustic signal with a preset active condition. The movement signal may be generated according to the movement of the second electronic device 120, and the second electronic device 120 may sense the movement signal as an active signal by comparing the movement signal with a preset movement condition.

In operation 421, the second electronic device 120 may receive a reference signal from the first electronic device 110. For example, the reference signal may include at least any one of unique identification information and location information on the first electronic device 110. Here, the second electronic device 120 may receive the reference signal via a communication function for communicating with the first electronic device 110. To this end, when the communication function is deactivated, the second electronic device 120 may activate the communication function in response to the active signal. Then, upon receiving the reference signal, the second electronic device 120 may deactivate the communication function. When the communication function is activated, the second electronic device 120 may maintain the communication function even though having received the reference signal. For example, the first electronic device 110 may periodically emit the reference signal, and the second electronic device 120 may receive the reference signal. Alternatively, the second electronic device 120 may request the reference signal from the first electronic device 110 and may receive the reference signal from the first electronic device 110 in response.

In operation 423, the second electronic device 120 may receive information of interest on the basis of the reference signal. For example, the information of interest may include at least any one of item information on a predetermined item 200 and guide information for guiding the download of the item information. The second electronic device 120 may receive the information of interest from at least any one of the first electronic device 110 and the third electronic device 130. For example, the second electronic device 120 may authenticate the reference signal to obtain an authentication result. Alternatively, the second electronic device 120 may request the third electronic device 130 to authenticate the reference signal and may receive an authentication result from the third electronic device 130. Then, the second electronic device 120 may request the information of interest from the third electronic device 130 on the basis of the authentication result and may receive the information of interest from the third electronic device 130 in response.

According to one embodiment, the third electronic device 130 may include a plurality of servers 510, 520, and 530. For example, the servers 510, 520, and 530 may include an authentication server 510, a notification server 520, and an information server 530. The authentication server 510 may authenticate the reference signal. For example, the authentication server 510 may perform authentication on the basis of at least any one of the identification information on the reference signal and the location information on the first electronic device 110. The notification server 520 may provide notification data to the second electronic device 120. To this end, the notification server 520 may store the notification data, corresponding to the reference signal. Here, when the authentication server 510 succeeds in authentication, the notification server 520 may provide the notification data to the second electronic device 120. For example, the notification data may include at least any one of an icon, a thumbnail, text, and address information on the information of interest. To this end, the authentication server 510 and the notification server 520 may directly share the authentication result or may share the authentication result via the second electronic device 120. The information server 530 may provide the information of interest to the second electronic device 120. Here, the information server 530 may provide the information of interest to the second electronic device 120 on the basis of the notification data.

Figure 5:
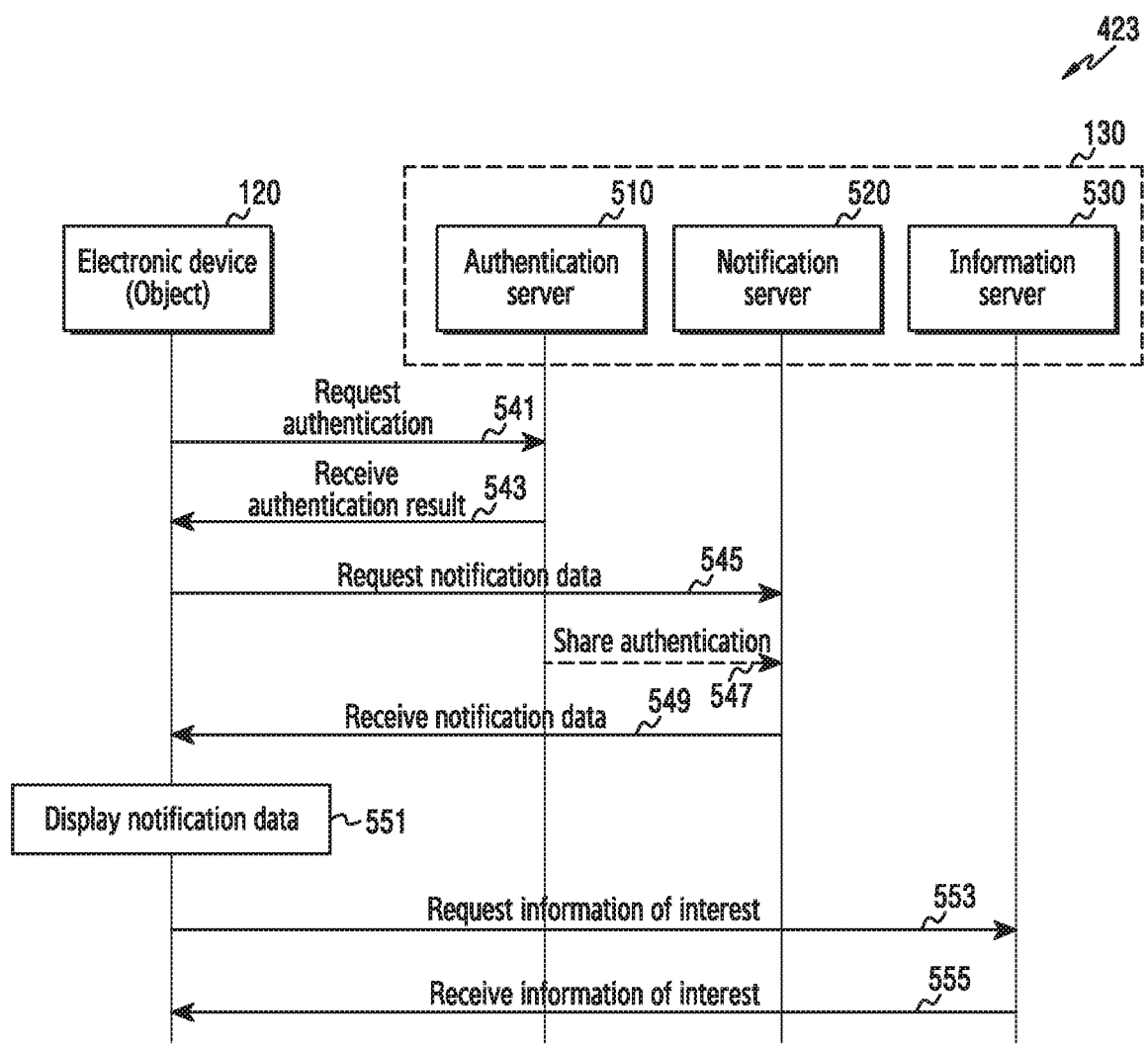
FIG. 5 is a flowchart illustrating signal flow in an operation of receiving information of interest illustrated in FIG. 4.

FIG. 5 is a flowchart illustrating signal flow in an information of interest reception operation illustrated in FIG. 4.

Referring to FIG. 5, in the communication system 100 according to various embodiments, the second electronic device 120 may request the authentication server 510 to authenticate a reference signal in operation 541. For example, the second electronic device 120 may detect at least any one of identification information from the reference signal and location information on the first electronic device 110 for the authentication server 510. The second electronic device 120 may transmit at least any one of the identification information on the reference signal and the location information on the first electronic device 110 to the authentication server 510 and may request the authentication of the reference signal.

In operation 543, the second electronic device 120 may receive an authentication result from the authentication server 510. Here, the authentication result may indicate either authentication success or authentication failure. For example, the authentication server 510 may perform authentication on the basis of at least any one of the identification information on the reference signal and the location information on the first electronic device 110. To this end, the authentication server 510 may include an authentication database or may be connected to the authentication database. The authentication server 510 may determine whether at least any one of the identification information on the reference signal and the location information on the first electronic device 110 is stored in the authentication database. Here, when at least any one of the identification information on the reference signal and the location information on the first electronic device 110 is stored in the authentication database, the authentication server 510 may determine that the authentication succeeded. However, when at least any one of the identification information on the reference signal and the location information on the first electronic device 110 is not stored in the authentication database, the authentication server 510 may determine that the authentication failed. Then, the authentication server 510 may transmit the authentication result to the second electronic device 120.

In operation 545, the second electronic device 120 may request notification data from the notification server 520. For example, the second electronic device 120 may transmit, to the notification server 520, at least any one of the identification information on the reference signal and the location information on the first electronic device 110 along with the authentication result of the reference signal, thereby requesting notification data. Alternatively, the second electronic device 120 may transmit at least any one of the identification information on the reference signal and the location information on the first electronic device 110 to the notification server 520, thereby requesting notification data.

According to one embodiment, the authentication server 510 and the notification server 520 may share the authentication result of the reference signal in operation 547. For example, the notification server 520 may transmit at least any one of the identification information on the reference signal and the location information on the first electronic device 110 to the authentication server 510, thereby requesting the authentication result of the reference signal. In response, the notification server 520 may receive the authentication result of the reference signal from the authentication server 510.

In operation 549, the second electronic device 120 may receive the notification data from the notification server 520. Here, when the authentication result of the reference signal corresponds to authentication success, the notification server 520 may transmit the notification data to the second electronic device 120. For example, the notification data may include at least any one of an icon, a thumbnail, text, and address information of information of interest. To this end, the notification server 520 may include a notification database or may be connected to the notification database. The notification server 520 may detect the notification data from the notification database on the basis of at least any one of the identification information on the reference signal and the location information on the first electronic device 110. Then, the notification server 520 may transmit the notification data to the second electronic device 120. In operation 551, the second electronic device 120 may display the notification data.

In operation 553, the second electronic device 120 may request information of interest from the information server 530. Here, the second electronic device 120 may request information of interest from the information server 530 on the basis of the notification data. For example, the second electronic device 120 may request information of interest by transmitting at least any one of the identification information on the reference signal and the location information on the first electronic device 110 to the information server 530. Alternatively, the second electronic device 120 may request information of interest by transmitting at least any one of the identification information on the reference signal and the location information on the first electronic device 110 along with address information on the information of interest to the information server 530.

In operation 555, the second electronic device 120 may receive the information of interest from the information server 530. To this end, the information server 530 may include an information database or may be connected to the information database. The information server 530 may detect the information of interest from the information database on the basis of at least any one of the identification information on the reference signal and the location information on the first electronic device 110. Alternatively, the information server 530 may detect the information of interest from the information database on the basis of the address information on the information of interest. Then, the information server 530 may transmit the information of interest to the second electronic device 120. Next, the second electronic device 120 may return to FIG. 4.

In operation 425, the second electronic device 120 may display the information of interest.

In operation 427, the third electronic device 130 may perform a management function. To this end, the third electronic device 130 may analyze the object and may detect object information. For example, the object information may include at least any one of the item information on the predetermined item 200, the access time of the object, and the access count of the object. The access time of the object may indicate the access time of the second electronic device 120 and the third electronic device 130. The access count of the object may indicate the access count of the second electronic device 120 and the third electronic device 130. The third electronic device 130 may analyze the object information and may perform the management function. Here, the third electronic device 130 may compile statistics from the object information corresponding to each object and may also compile statistics from object information corresponding to a plurality of objects. The third electronic device 130 may manage a website.

For example, as illustrated in FIG. 6A, the third electronic device 130 may provide notification information on the item 200 for each object via the website. Accordingly, even though the object is located remotely from the first electronic device 110, the object may identify the notification information on the item 200 via the second electronic device 120. Further, as illustrated in FIG. 6B, the third electronic device 130 may determine and provide at least any one of location information, preference information, and ranking information on the item 200 through the website. Accordingly, the item 200 to be applied to the first electronic device 110 may be determined according to at least any one of the preference information and the ranking information on the item 200. Also, as illustrated in FIG. 6C, the third electronic device 130 may provide notification information on the item 200 for each object to the second electronic device 120. In addition, as illustrated in FIG. 6D, the third electronic device 130 may design a management solution for the first electronic device 110. For example, the third electronic device 130 may effectively determine the first content and the second content corresponding to the item 200.

According to various embodiments, the first electronic device 110 may provide various interactions using the first display unit 111 having variable transparency. That is, the first electronic device 110 may respond to the object through the first display unit 111 and may provide various interactions. In this manner, the first electronic device 110 may efficiently attract people's attention. In addition, the first electronic device 110 may highlight the item 200 through the second display unit 113. Moreover, the first electronic device 110 may provide the information of interest for the object. Accordingly, the electronic device 110 may effectively display the item 200.

According to various embodiments, the second electronic device 120 may receive the reference signal, not unconditionally but in response to an active signal. That is, the second electronic device 120 may receive the reference signal as needed. Accordingly, the power consumption of the second electronic device 120 may be reduced. Further, the second electronic device 120 does not need to perform an operation of changing settings to receive the reference signal. Accordingly, the second electronic device 120 may easily receive the information of interest. Thus, the operation efficiency of the second electronic device 120 may be improved, and the second electronic device 120 may detect the active signal from the user's simple operation. As a result, the convenience of the user using the second electronic device 120 may be improved.

Figure 7:
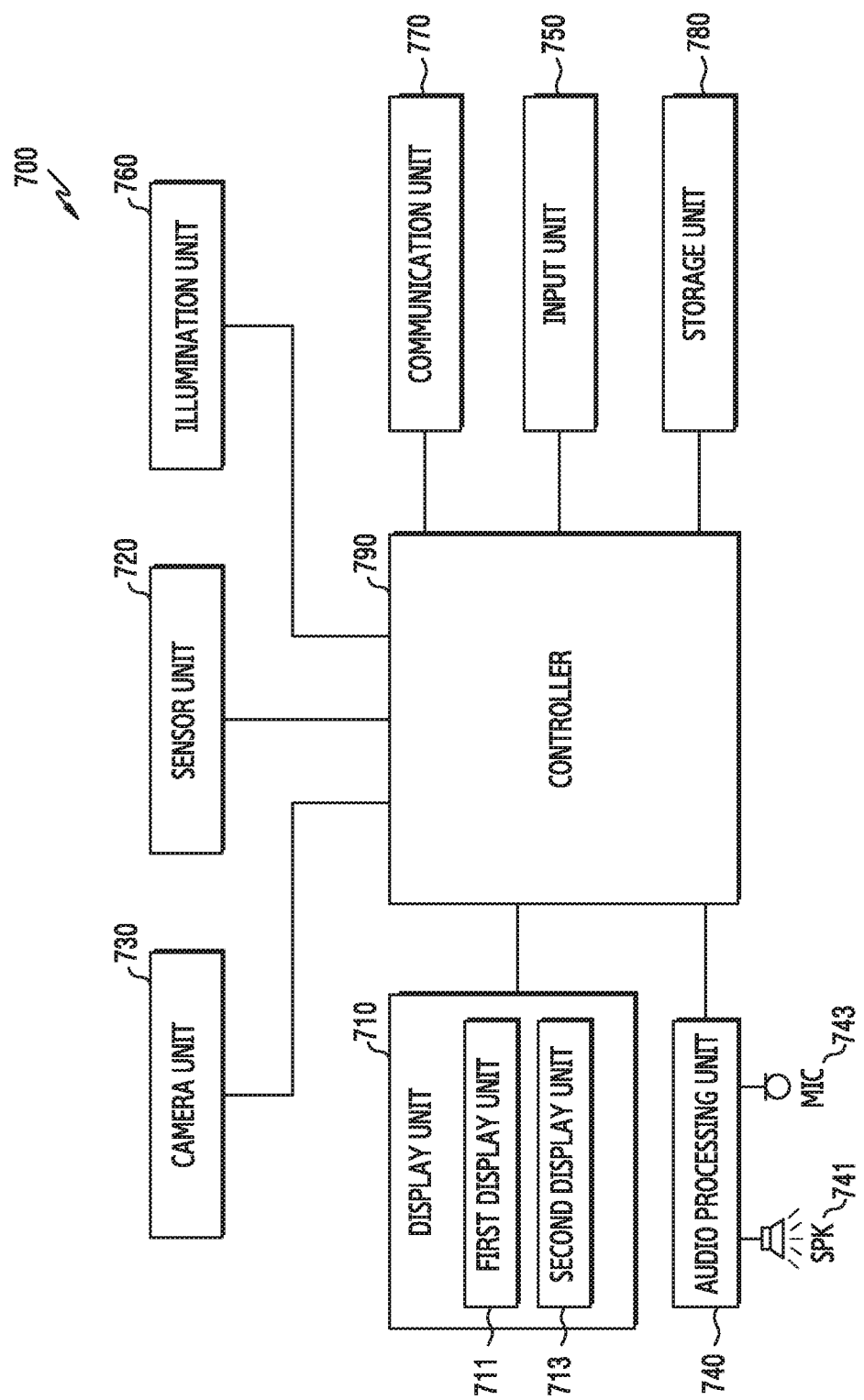
FIG. 7 is a block diagram illustrating an electronic device according to various embodiments.

FIG. 7 is a block diagram illustrating an electronic device 700 according to various embodiments.

Referring to FIG. 7, the electronic device 700 according to various embodiments may include a display unit 710, a sensor unit 720, a camera unit 730, an audio processing unit 740, an input unit 750, an illumination unit 760, a communication unit 770, a storage unit 780, and a controller 790. According to various embodiments, the electronic device 700 may be a first electronic device (110 in FIG. 1) in a communication system (100 in FIG. 1).

The display unit 710 may output display data in the electronic device 700. The display unit 710 may include at least two display units 711 and 713. In this case, the display unit 710 may include a first display unit 711 and a second display unit 713. According to various embodiments, the first display unit 711 may be the first display unit 111 of the first electronic device (100 in FIG. 1), and the second display unit 713 may be the second display unit 113 of the first display device (100 in FIG. 1).

According to various embodiments, the first display unit 711 and the second display unit 713 may be spaced apart from each other. Here, a first direction and a second direction may be defined based on the first display unit 711. For example, the first direction may be the front of the first display unit 711, and the second direction may be the rear of the first display unit 711. The second display unit 713 may be disposed at the rear of the first display unit 711. For example, the first display unit 711 and the second display unit 713 may be disposed side by side and may be inclined from each other. Accordingly, a space may be formed between the first display unit 711 and the second display unit 713, and an item 1500 in FIG. 15 may be positioned in the space.

The first display unit 711 may have variable transparency. Here, the first display unit 711 may output display data with the transparency being relatively low. The first display unit 711 may display the second direction from the first direction with the transparency being relatively high. For example, the first display unit 711 may include at least any one of a transparent Liquid Crystal Display (LCD), a transparent Thin-Film Electroluminescent (TFEL) display, and a transparent Organic Light Emitting Diode (OLED) display. A transparent LCD is similar to a general LCD but may include, without a backlight unit, a pair of polarizing plates, an optical film, a transparent thin film transistor, and a transparent electrode. A transparent TFEL display may be configured using an inorganic TFEL (AC-TFEL) display including a transparent electrode, an inorganic phosphor, and an insulating film. An inorganic TFEL display may emit light as a phosphor is excited when accelerated electrons pass through the inside of the phosphor. A transparent OLED display can autonomously emit light and may be configured using both electrodes which are transparent electrodes. Here, at least any one of at least one transparent TFEL display and at least one transparent LCD may be bonded to one or both sides of a transparent OLED display.

According to one embodiment, the first display unit 711 may include a transparent LCD, a driver, a transmission panel, and a light source. The transmission panel may be disposed on the entire surface of the transparent LCD. The driver may be disposed at a lower part the transparent LCD, and the light source unit may be disposed at a lower part the transparent panel. The light source may generate an optical signal and may radiate the optical signal to the side surface of the lower part of the transmission panel. The transmission panel may totally reflect the optical signal to the transparent LCD. The transparent LCD may include a liquid crystal layer. The transparent LCD may be operated by the driver to transmit or reflect the optical signal. For example, the liquid crystal layer of the transparent LCD may be changed to a planar state by the driver. Accordingly, the transparency of the transparent LCD may be decreased, so that the transparent LCD may be turned into an opaque state. In the opaque state, the transparent LCD may reflect the optical signal. Further, the liquid crystal layer of the transparent LCD may be changed to a homeotropic state by the driver. Accordingly, the transparency of the transparent LCD may be increased, so that the transparent LCD may be turned into a transparent state. In the transparent state, the transparent LCD may transmit the optical signal.

The second display unit 713 may be disposed to face the first display unit 711. For example, the second display unit 713 may include at least any one of a Liquid Crystal Display (LCD), a Light Emitting Diode (LED) display, an Organic Light Emitting Diode (OLED) display, an Active Matrix Organic Light Emitting Diode (AMOLED) display, a Micro-Electro-Mechanical Systems (MEMS) display, and an electronic paper display. Alternatively, the second display unit 713 may include a projector and a screen. The screen may be disposed in the second direction of the first display unit 711 and the projector may be disposed between the first display unit 711 and the second display unit 713. The projector may project light onto the screen and may output display data.

The sensor unit 720 may measure the peripheral physical quantities of the electronic device 700. Further, the sensor unit 720 may sense the state of the electronic device 700. That is, the sensor unit 720 may detect a physical signal. The sensor unit 720 may convert a physical signal into an electrical signal. The sensor unit 720 may include at least one sensor. For example, the sensor unit 720 may include at least any one of a gesture sensor, a proximity sensor, an illuminance sensor, a temperature-humidity sensor, a thermal sensor, and a motion sensor.

The camera unit 730 may generate image data in the electronic device 700. To this end, the camera unit 730 may receive an optical signal. The camera unit 730 may generate the image data from the optical signal. Here, the camera unit 730 may include a camera sensor and a signal conversion unit. The camera sensor may convert an optical signal into an electrical image signal. The signal conversion unit may convert an analog image signal into digital image data.

The audio processing unit 740 may process an audio signal in the electronic device 700. In this case, the audio processing unit 740 may include a speaker (SPK) 741 and a microphone (MIC) 743. That is, the audio processing unit 740 may play the audio signal through the speaker 741. The audio processing unit 740 may collect the audio signal through the microphone 743.

The input unit 750 may generate input data in the electronic device 700. Here, the input unit 750 may include at least one input tool. For example, the input unit 750 may include at least any one of a key pad, a dome switch, a physical button, a touch panel, and a jog shuttle. The touch panel may be coupled to the first display unit 711 to be configured as a touch screen. For example, the touch panel may be at least one of an electrostatic type, a pressure-sensitive type, an infrared type, and an ultrasonic type. The touch screen may detect at least any one of a touch, a gesture, proximity, and hovering relating to an object.

The illumination unit 760 may support a display effect of the display unit 710. For example, the illumination unit 760 may be disposed between the first display unit 711 and the second display unit 713. Here, the illumination unit 760 may be turned on or off. Further, the illumination unit 760 may adjust dimming. For example, the illumination unit 760 may include at least one LED.

The communication unit 770 may perform communication in the electronic device 700. Here, the communication unit 770 may communicate with an external device using various communication methods. For example, the communication unit 770 may perform communication in a wired or wireless manner. To this end, the communication unit 770 may include at least one antenna. The communication unit 770 may be connected to at least any one of a mobile communication network and a data communication network. Further, the communication unit 770 may perform near-field communication. For example, the external device may include at least any one of an electronic device, a base station, a server, and a satellite. According to various embodiments, the external device may include at least any one of a second electronic device (120 in FIG. 1) and a third electronic device (130 in FIG. 1) in the communication system (100 in FIG. 1). In addition, the communication methods may include Long-Term Evolution (LTE), Wideband Code Division Multiple Access (WCDMA), Global System for Mobile Communications (GSM), Wireless Fidelity (Wi-Fi), Wireless Local Area Network (WLAN), Bluetooth, and Near-Field Communication (NFC).

The storage unit 780 may store operation programs of the electronic device 700. The storage unit 780 may store data generated during the execution of the programs. For example, the storage unit 780 may include at least any one of an internal memory and an external memory. The internal memory may include at least any one of a volatile memory (e.g., a DRAM, a SRAM, and a SDRAM,) and a nonvolatile memory (e.g., a One-Time Programmable ROM (OTPROM), a PROM, an EPROM, an EEPROM, a mask ROM, a flash ROM, a flash memory, a hard drive, or a Solid-State Drive (SSD)). The external memory may include at least any one of a flash drive, a Compact Flash (CF), a Secure Digital (SD), a micro-SD, a mini-SD, an extreme digital (xD), a Multi-Media Card (MMC), and a memory stick.

According to various embodiments, the storage unit 780 may store programs for sensing an object and for controlling the display unit 710. The storage unit 780 may store content to be played on the display unit 710. Here, the storage unit 780 may store first content for the first display unit 711 and second content for the second display unit 713. Here, each of the first content and the second content may include at least any one of image data and audio data. The storage unit 780 may further store at least any one of item information on an item (200 in FIG. 2) and object information on an object.

The controller 790 may control the overall operation in the electronic device 700. Here, the controller 790 may perform various functions. To this end, the controller 790 may control the components of the electronic device 700. The controller 790 may receive and process a command or data from the components of the electronic device 700.

According to various embodiments, the controller 790 may play the first content on the first display unit 711. To this end, the controller 790 may decrease the transparency of the first display unit 711. For example, the controller 790 may set the first display unit 711 to an opaque state. When the first content is played on the first display unit 711, the controller 790 may turn off the illumination unit 760 or may perform dimming.

According to various embodiments, the controller 790 may sense an object. Here, the controller 790 may sense the approach of the object. That is, the controller 790 may detect the object within a preset radius from the first display unit 711. For example, the controller 790 may sense the object using at least any one of the sensor unit 720, the camera unit 730, and the audio processing unit 740. The controller 790 may sense at least one of the movement and the heat of the object within the preset radius using the sensor unit 720. Alternatively, the controller 790 may capture image data using the camera unit 730 and may sense the size of the object in the image data. Alternatively, the controller 790 may collect an audio signal through the microphone 743 using the audio processing unit 740 and may sense the movement of the object in the audio signal.

According to one embodiment, the controller 790 may sense a face. When the object is a user, the controller 790 may sense the face of the user. Here, the controller 790 may obtain image data using the camera unit 730 and may sense the face of the user from the image data. For example, the controller 790 may sense the face of the user using at least any one of a face detection scheme, a face recognition scheme, a face direction detection scheme, and an eye tracking scheme. According to the face detection scheme, the controller 790 may divide the image data into a face area corresponding to the face and a background area. Accordingly, the controller 790 may detect the position of the face in the image data. According to the face recognition scheme, the controller 790 may detect feature points, such as an eye, a nose, and a mouth, from the image data, thereby identifying the face. Accordingly, the controller 790 may identify the user on the basis of the face. According to the face direction detection scheme, the controller 790 may identify the direction of the face, for example, a front face and a side face, in the image data. According to the eye tracking scheme, the controller 790 may identify eyes from the image data and may track a gaze from the movement of the eyes.

According to various embodiments, the controller 790 may adjust the transparency of the first display unit 711. Here, the controller 790 may increase the transparency of at least a portion of the first display unit 711. Here, the controller 790 may determine the portion of the first display unit 711 as a transparent area on the basis of the location of the object. The controller 790 may increase the transparency of the portion of the first display unit 711. For example, the first electronic device 110 may change the portion of the first display unit 711 to a transparent state. In addition, the controller 790 may move the transparent area in the first display unit 711 according to the movement of the object. For example, the controller 790 may change the portion of the first display unit 711 to an opaque state and may change another portion of the first display unit 711 to a transparent state.

According to one embodiment, when the face is sensed for a preset time, the controller 790 may adjust the transparency of the first display 711. For example, when at least any one of the position of the face, the direction of the face, and the position of the eyes is maintained for the preset time, the controller 790 may adjust the transparency of the first display unit 711. Here, the transparency of the entire area of the first display unit 711 may be increased. For example, the controller 790 may change the entire area of the first display unit 711 to the transparent state.

According to various embodiments, the controller 790 may play the second content on the second display unit 713. To this end, the controller 790 may turn on the second display unit 713. For example, when the transparency of the entire area of the first display unit 711 is increased, the controller 790 may play the second content on the second display unit 713. When playing the second content on the second display unit 713, the controller 790 may turn on the illumination unit 760 or may perform dimming up.

According to various embodiments, the controller 790 may detect object information on the object. For example, the object information may include at least any one of item information on a predetermined item 200, the approach time of the object, and a feature of the object. The approach time of the object may include approach start time and an approach retention period. The feature of the object may include at least any one of the age, gender, race, and personality of the object and may be detected from at least any one of image data on the object, an audio signal of the object, a movement of the object, and the heat of the object. The controller 790 may store the object information in the storage unit 780. The controller 790 may also transmit the object information to an external device. Here, the external device may be the third electronic device 130 of the communication system (100 of FIG. 1).

According to various embodiments, the controller 790 may transmit a reference signal. For example, the reference signal may include at least any one of unique identification information and location information on the electronic device 700. Here, the controller 790 may radiate the reference signal within a predetermined radius. For example, the controller 790 may periodically radiate the reference signal. Alternatively, the controller 790 may transmit the reference signal to an external device in response to a request from the external device. Here, the external device may be the second electronic device 120 of the communication system (100 of FIG. 1).

According to various embodiments, the controller 790 may display information of interest on the first display unit 711. For example, the information of interest may include at least any one of item information on a predetermined item 200 and guide information for guiding as to the download of the item information. The controller 790 may transmit the information of interest to an external device in response to a request from the external device. Here, the external device may be the second electronic device 120 of the communication system (100 of FIG. 1).

According to various embodiments, the electronic device 700 may provide various interactions using the first display unit 711 having variable transparency. That is, the electronic device 700 may respond to the object through the first display unit 711 and may provide various interactions. In this manner, the electronic device 700 may efficiently attract people's attention. In addition, the electronic device 700 may highlight the item (200 in FIG. 2) through the second display unit 713. Moreover, the electronic device 700 may provide the information of interest for the object. Accordingly, the electronic device 700 may effectively display the item (200 in FIG. 2).

Figure 8:
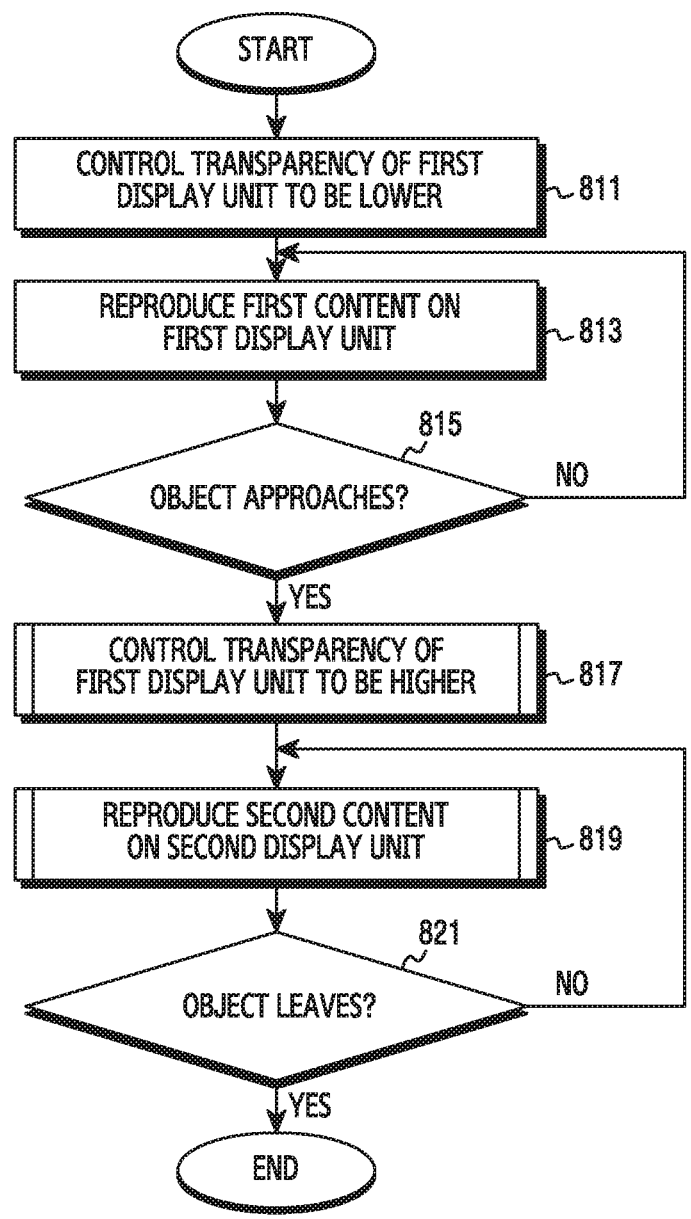
FIG. 8 is a flowchart illustrating a method for operating an electronic device according to various embodiments.

FIG. 8 is a flowchart illustrating a method for operating the electronic device 700 according to various embodiments. FIGS. 15A, 15B, 16, 17, 18A, 18B, and 19 illustrate examples of the method for operating the electronic device 700 according to various embodiments.

Referring to FIG. 8, the method for operating the electronic device 700 according to various embodiments may start by the controller 790 decreasing the transparency of the first display unit 711 in operation 811. For example, the controller 790 may set the first display unit 711 to an opaque state. In addition, the controller 790 may turn off the second display unit 713. When first content is played on the first display unit 711, the controller 790 may turn off the illumination unit 760 or may perform dimming.

In operation 813, the controller 790 may play the first content on the first display unit 711. For example, the first content may be stored in the storage unit 780. Here, the first content may include at least any one of image data and audio data. That is, the controller 790 may output the image data of the first content through the first display unit 711. In addition, the controller 790 may output the audio data of the first content through the audio processing unit 740 and the speaker 741.

Figure 15A:
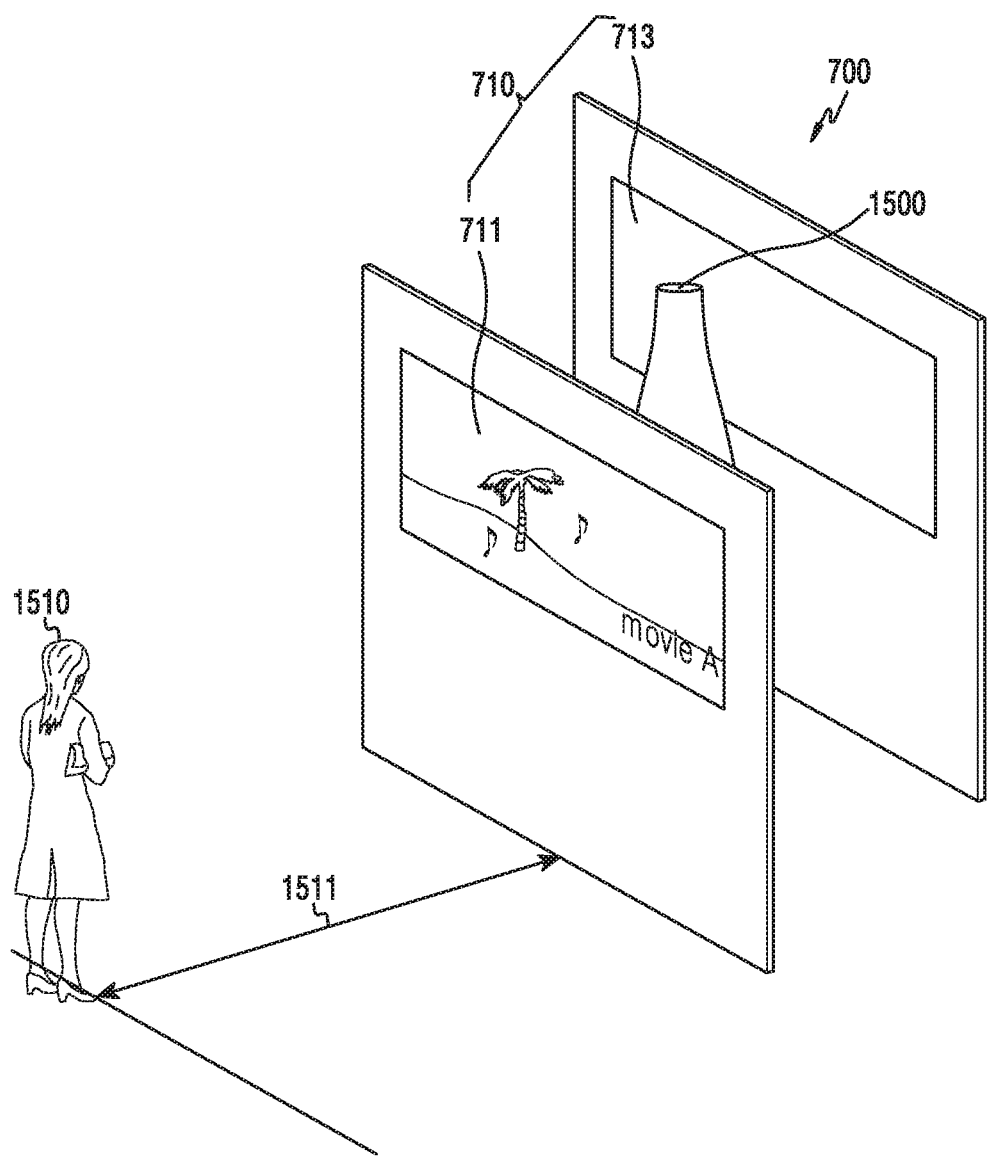
FIGS. 15A, 15B, 16, 17, 18A, 18B, and 19 illustrate examples of a method for operating an electronic device according to various embodiments.
Figure 15B:
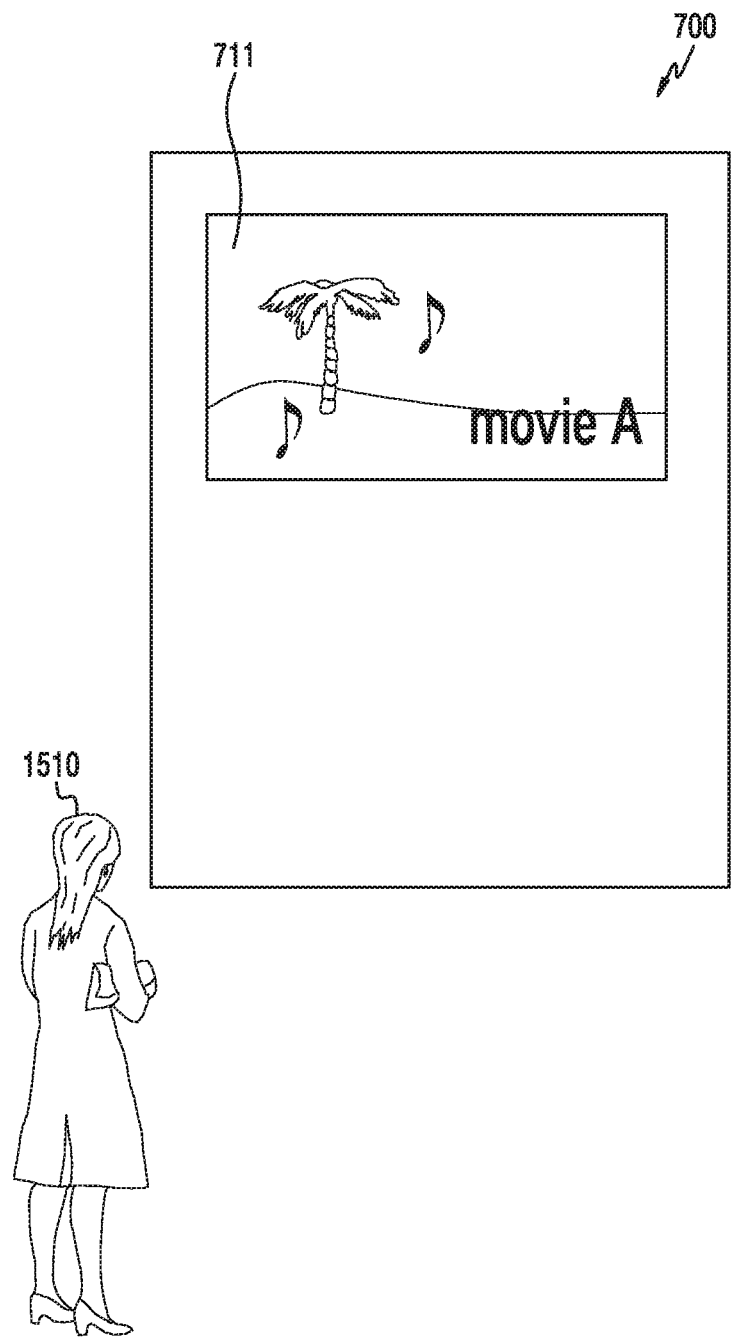

For example, as illustrated in FIGS. 15A and 15B, the controller 790 may play the first content on the first display unit 711. The second display unit 713 may be turned off. Here, the first display unit 711 and the second display unit 713 may be spaced apart from each other. Here, a first direction and a second direction may be defined based on the first display unit 711. For example, the first direction may be the front of the first display unit 711, and the second direction may be the rear of the first display unit 711. The second display unit 713 may be disposed at the rear of the first display unit 711. For example, the first display unit 711 and the second display unit 713 may be disposed side by side and may be inclined from each other. Accordingly, a space may be formed between the first display unit 711 and the second display unit 713, and an item 1500 in FIG. 15 may be positioned in the space. Accordingly, when an object 1510 is located at a position separated by a preset radius 1511 or longer from the first display unit 711 in the first direction, the object 1510 can see the first content on the first display unit 710.

In operation 815, when an object 1510 approaches, the controller 790 may sense that the object 1510 is approaching. Here, the controller 790 may detect the object 1510 within a preset radius 1511 from the first display unit 711. For example, the controller 790 may detect the object 1510 using at least any one of the sensor unit 720, the camera unit 730, and the audio processing unit 740. Here, the controller 790 may detect at least any one of the distance of the object 1510 and the location of the object 1510 corresponding to the first display unit 711.

For example, the controller 790 may capture image data using the camera unit 730. The controller 790 may detect the object 1510 in the image data. Further, the controller 790 may determine the size of the object 1510 and may compare the size of the object 1510 with a preset threshold value.

When the size of the object 1510 is the threshold value or greater, the controller 790 may determine that the object 1510 is positioned within the preset radius 1511. In this manner, the controller 790 may sense the approach of the object 1510.

Alternatively, the controller 790 may collect an audio signal using the audio processing unit 740. The controller 790 may detect the object 1510 in the audio signal. Also, the controller 790 may compare the voice strength of the object 1510 with a preset threshold value. When the voice strength of the object 1510 is the threshold value or greater, the controller 790 may determine that the object 1510 is positioned within the preset radius 1511. In this manner, the controller 790 may sense the access of the object 1510.

Alternatively, the controller 790 may sense a movement using the sensor unit 720. The controller 790 may detect the object 1510 from the movement. When the movement is sensed, the controller 790 may determine that the object 1510 is positioned within the preset radius 1511. In this manner, the controller 790 may sense the access of the object 1510.

Alternatively, the controller 790 may sense heat generation using the sensor unit 720. The controller 790 may detect the object 1510 from the heat. When the heat is sensed, the controller 790 may determine that the object 1510 is positioned within the preset radius 1511. In this manner, the controller 790 may sense the access of the object 1510.

When the approach of the object 1510 is sensed in operation 815, the controller 790 may adjust the transparency of the first display unit 711 in operation 817. Here, the controller 790 may increase the transparency of at least a portion of the first display unit 711. Here, the controller 790 may determine the portion of the first display unit 711 as a transparent area 1610 on the basis of the location of the object 1510. The controller 790 may increase the transparency of the transparent area 1610. In addition, the controller 790 may move the transparent area 1610 in the first display unit 711 according to the movement of the object 1510. Moreover, when a face is sensed for a preset time, the controller 790 may determine the entire area of the first display unit 711 as the transparent area 1610. For example, the controller 790 may change the transparent area 1610 to a transparent state.

Figure 16:
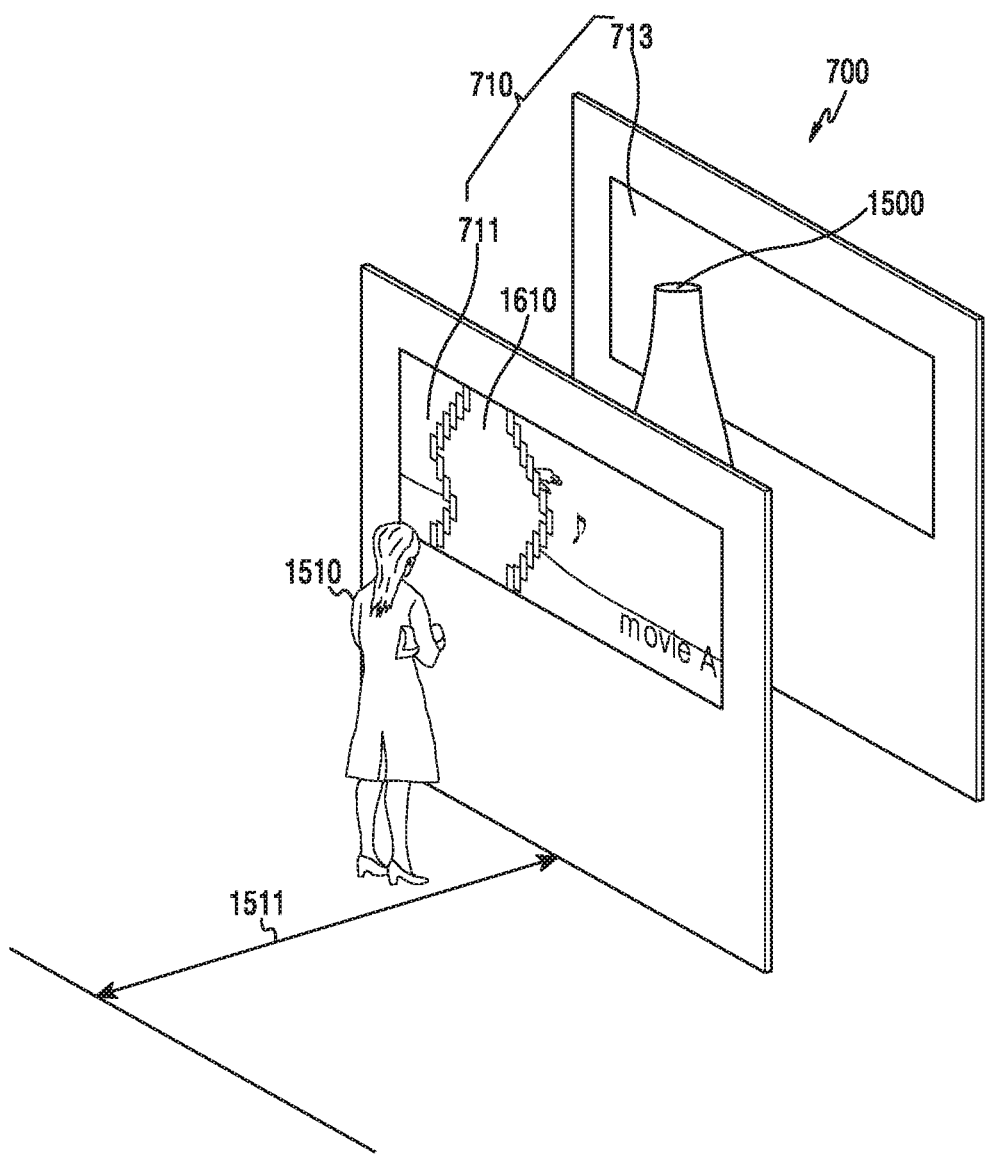
Figure 17:
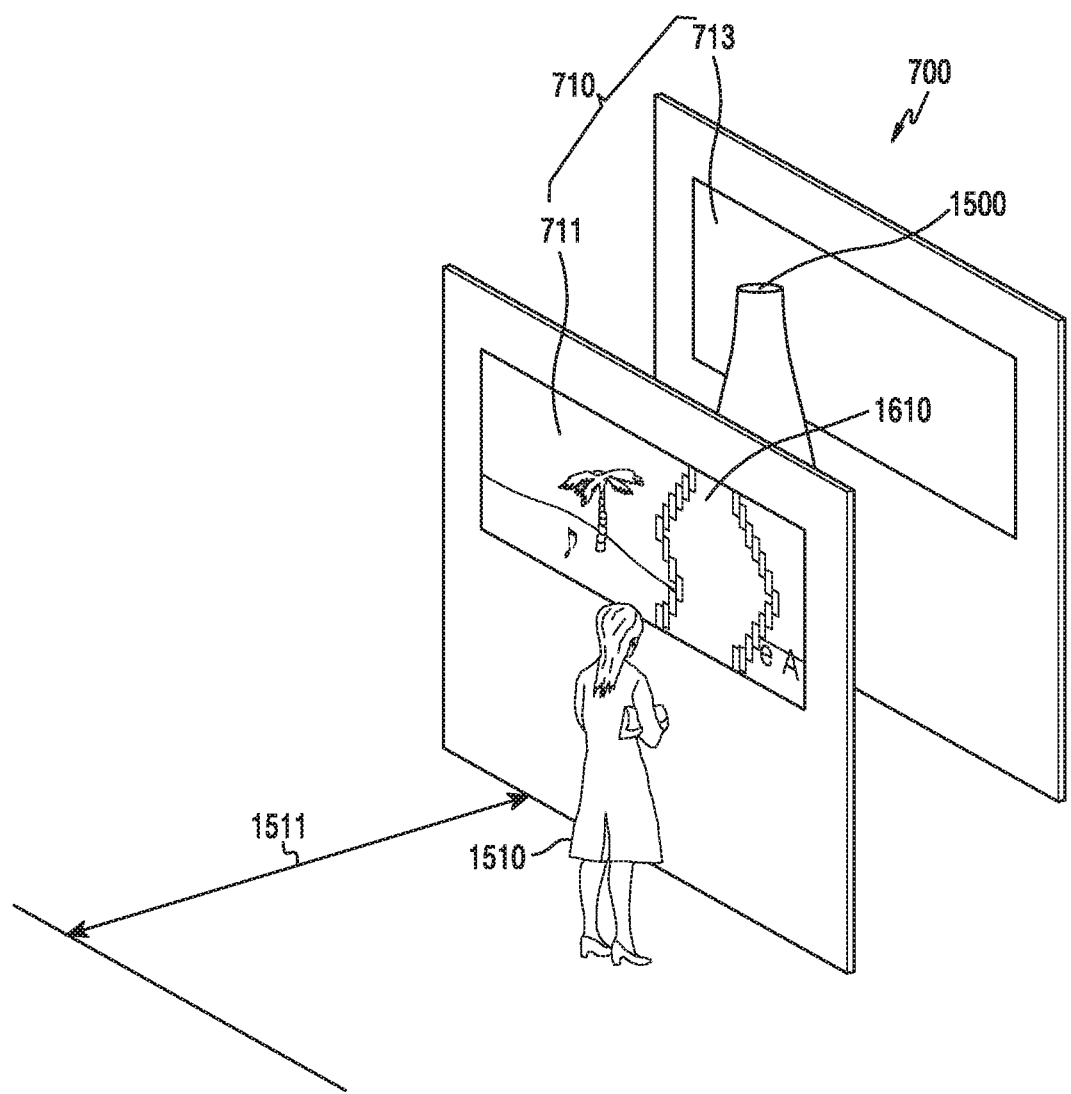
Figure 18A:
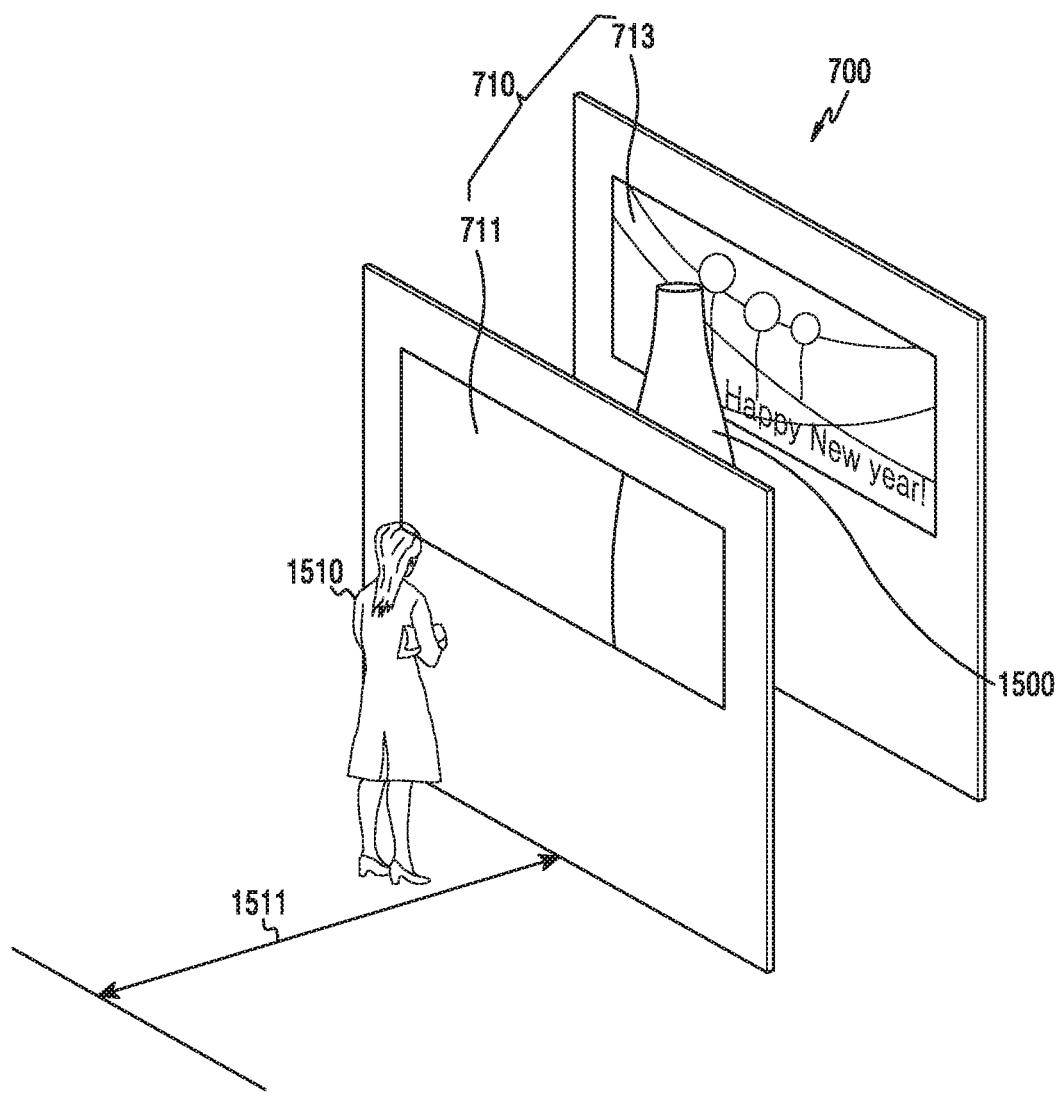
Figure 18B:
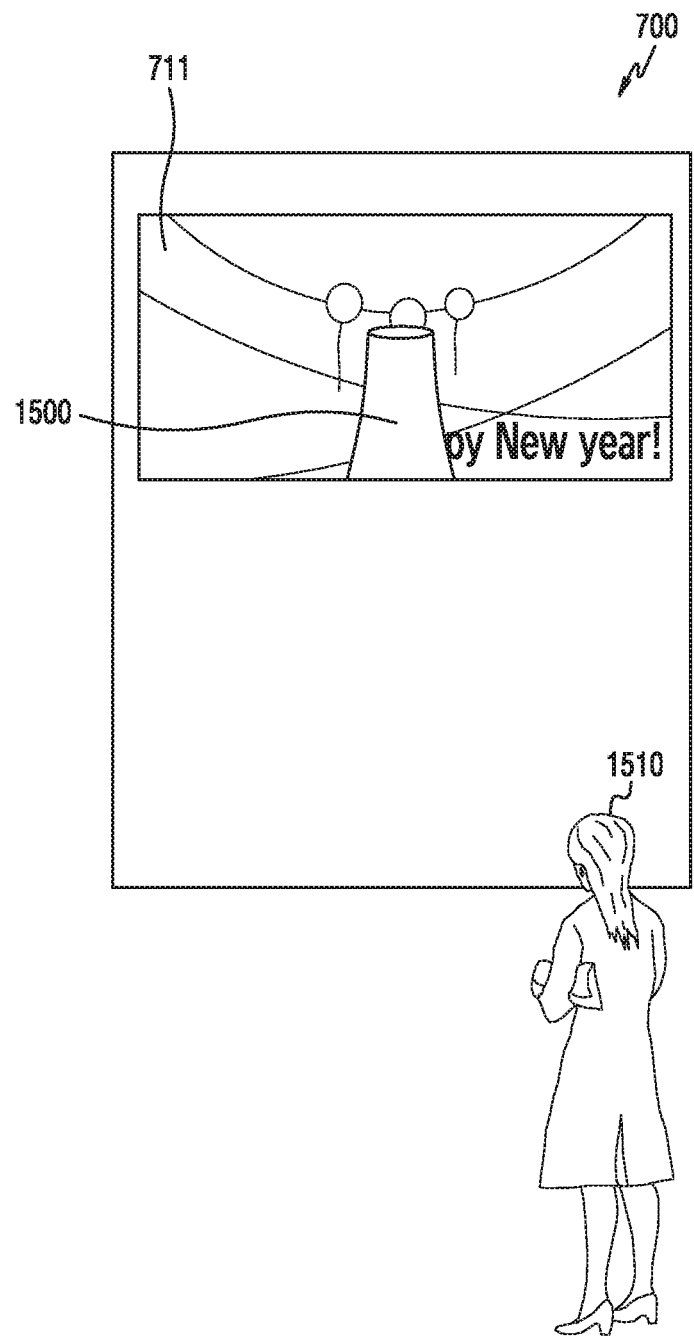

For example, as illustrated in FIG. 16 or 17, the controller 790 may determine a portion of the first display unit 711 as the transparent area 1610. Further, as illustrated in FIGS. 18A and 18B, the controller 790 may determine the entire area as of the first display unit 711 the transparent area 1610. That is, when the object 1510 is sensed within the preset radius 1511 in the first direction from the first display unit 711, the controller 790 may determine at least a portion of the first display unit 711 as the transparent area 1610. Accordingly, the object 1510 can see the item 1500 through the transparent area 1610 of the first display unit 711 in the first direction of the first display unit 711.

Figure 9:
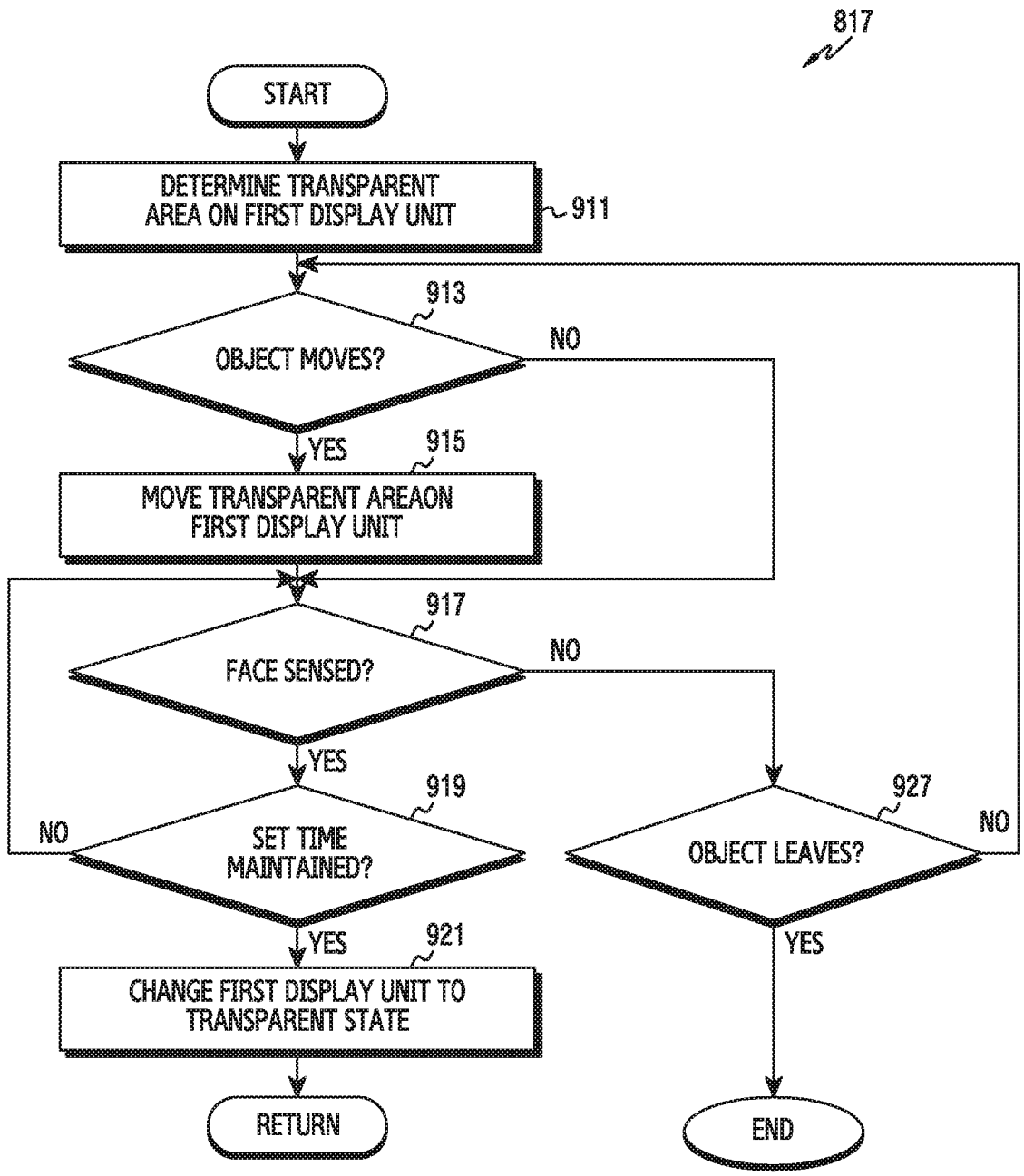
FIG. 9 is a flowchart illustrating an operation of increasing the transparency of a first display unit illustrated in FIG. 8.

FIG. 9 is a flowchart illustrating an operation of increasing the transparency of the first display unit 711 in FIG. 8.

Referring to FIG. 9, when the approach of the object 1510 is sensed in operation 815, the controller 790 may determine the transparent area 1610 on the first display unit 711 in operation 911. Here, the controller 790 may determine the portion of the first display unit 711 as a transparent area 1610 on the basis of the location of the object 1510. For example, the location of the transparent area 1610 on the first display unit 711 may correspond to the location of the object 1510. To this end, the controller 790 may increase the transparency of the portion of the first display unit 711. For example, the controller 790 may change the portion of the first display unit 711 to a transparent state.

For example, when the object 1510 approaches within the preset radius 1511 from the first display unit 711, the controller 790 may determine a portion of the first display unit 711 as the transparent area 1610, as illustrated in FIG. 16. Here, the controller 790 may determine the location of the transparent area 1610 on the first display unit 711 corresponding to the location of the object 1510. The controller 790 may then change the transparent area 1610 to a transparent state. The controller 790 may continuously play the first content on the first display unit 711. Here, the first content may be output in the remaining area of the first display unit 711. Accordingly, the object 1510 can not only view the first content on the first display unit 711 but can also see the item 1500 through the transparent area 1610 of the first display unit 711, in the first direction of the first display unit 711.

When the object 1510 moves, the controller 790 may sense that the object 1510 is moving in operation 913. Here, the controller 790 may continuously detect the object 1510 within the preset radius 1511 from the first display unit 711. For example, the object 1510 may move along the first display unit 711 within the preset radius 1511 from the first display unit 711. Here, at least any one of the distance of the object 1510 and the location of the object 1510 may be changed corresponding to the first display unit 711. Thus, the controller 790 may continuously sense the object 1510 using at least any one of the sensor unit 720, the camera unit 730, and the audio processing unit 740.

When the movement of the object 1510 is sensed in operation 913, the controller 790 may move the transparent area 1610 on the first display unit 711 in operation 915. Here, the controller 790 may determine another portion of the first display unit 711 as the transparent area 1610 on the basis of the location of the object 1510. That is, as the location of the object 1510 is changed, the controller 790 may change the location of the transparent area 1610 on the first display unit 711. To this end, the controller 790 may decrease the transparency of the portion of the first display unit 711 and may increase the transparency of the other portion of the first display unit 711. For example, the controller 790 may change the portion of the first display unit 711 to an opaque state and may change the other portion of the first display unit 711 to a transparent state.

For example, when the object 1510 moves within the preset radius 1511 from the first display unit 711, the controller 790 may determine another portion of the first display unit 711 as the transparent area 1610, as illustrated in FIG. 17. For example, the controller 790 may determine the location of the transparent area 1610 on the first display unit 711 corresponding to the location of the object 1510. The controller 790 may then change the transparent area 1610 to a transparent state. The controller 790 may continuously play the first content on the first display unit 711. Here, the first content may be output in the remaining area of the first display unit 711. Accordingly, the object 1510 can not only view the first content on the first display unit 711 but can also see the item 1500 through the transparent area 1610 of the first display unit 711, in the first direction of the first display unit 711.

In operation 917, the controller 790 may sense a face. When the object 1510 is a user, the controller 790 may sense the face of the user. Here, the controller 790 may sense the face of the user from image data from the camera unit 730. For example, the controller 790 may sense the face of the user using at least any one of a face detection scheme, a face recognition scheme, a face direction detection scheme, and an eye tracking scheme.

According to the face detection scheme, the controller 790 may divide the image data into a face area corresponding to the face and a background area. Accordingly, the controller 790 may detect the position of the face in the image data. According to the face recognition scheme, the controller 790 may detect feature points, such as an eye, a nose, and a mouth, from the image data, thereby identifying the face. Accordingly, the controller 790 may identify the user on the basis of the face. According to the face direction detection scheme, the controller 790 may identify the direction of the face, for example, a front face and a side face, in the image data. According to the eye tracking scheme, the controller 790 may identify eyes from the image data and may track a gaze from the movement of the eyes.

When the movement of the object 1510 is not sensed in operation 913, the controller 790 may perform operation 917. Here, the controller 790 may sense the face in operation 917 while maintaining the transparent area on the first display unit 711. That is, the controller 790 may sense the face without changing the location of the transparent area 1610 on the first display unit 711.

When the face is sensed in operation 917, the controller 790 may determine whether a preset time is maintained in operation 919. That is, the controller 790 may determine whether the face is sensed for the preset time. For example, the controller 790 may determine whether at least any one of the face position, the direction of the face, and the position of the eyes is maintained for the preset time.

When it is determined that the preset time has been maintained in operation 919, the controller 790 may adjust the transparency of the first display unit 711 in operation 921. That is, when the face is sensed for the preset time, the controller 790 may adjust the transparency of the first display unit 711. For example, when it is determined that at least any one of the face position, the direction of the face, and the position of the eyes is maintained for the preset time, the controller 790 may adjust the transparency of the first display unit 711. Here, the controller 790 may increase the transparency of the entire area of the first display unit 711. That is, the controller 790 may determine the entire area of the first display unit 711 as a transparent area. For example, the controller 790 may change the entire area of the first display unit 711 to a transparent state. Then, the controller 790 may return to FIG. 8.

For example, when the face of the object 1510 is sensed within the preset radius 1511 for the preset time, the controller 790 may determine the entire area of the first display unit 711 as the transparent area 1610, as illustrated in FIGS. 18A and 18B. The controller 790 may then change the entire area of the first display unit 711 to a transparent state. The controller 790 may stop playing the first content on the first display unit 711. Accordingly, the object 1510 can see the item 1500 through the entire area of the first display unit 711 in the first direction of the first display unit 711.

When it is determined that the preset time has not been maintained in operation 919, the controller 790 may return to operation 917. Accordingly, the controller 790 may continuously sense the face in operation 917. That is, the controller 790 may continuously sense the face of the user from the image data from the camera unit 730.

When the object 1510 leaves, the controller 790 may sense that the object 1510 has left in operation 927. That is, when the face is not sensed in operation 917, the controller 790 may sense that the object 1510 has left. Here, when the object 1510 is not detected within the preset radius 1511 from the first display unit 711, the controller 790 may sense that the object 1510 has left. Then, the controller 790 may terminate the operation method of the electronic device 700. That is, the controller 790 may return to a state before the approach of the object 1510 is sensed. Here, the controller 790 may decrease the transparency of the transparent area 1610 of the first display unit 711.

When it is not sensed that the object 1510 has left in operation 927, the controller 790 may return to operation 913. That is, when the face is not sensed but the object 1510 is sensed within the preset radius 1511 from the first display unit 711, the controller 790 may return to operation 913.

Subsequently, the controller 790 may play second content on the second display unit 713 in operation 819. For example, the second content may be stored in the storage unit 780. Here, the second content may include at least any one of image data and audio data. That is, the controller 790 may output the image data of the second content through the second display unit 713. In addition, the controller 790 may output the audio data of the second content through the audio processing unit 740 and the speaker 741. To this end, the controller 790 may turn on the second display unit 713. For example, when the transparency of the entire area of the first display unit 711 is increased, the controller 790 may play the second content in the second display unit 713. When playing the second content on the second display unit 713, the controller 790 may turn on the illumination unit 760 or may perform dimming up.

For example, as illustrated in FIGS. 18A and 18B, the controller 790 may play the second content on the second display unit 713. That is, the controller 790 may turn on the second display unit 713 and may then play the second content on the second display unit 713. Here, the entire area of the first display unit 711 may be in a transparent state. Accordingly, the object 1510 can see not only the item 1500 but also the second content on the second display unit 713 through the entire area of the first display unit 711 in the first direction of the first display unit 711. That is, the object 1510 can see the item 1500 with the second content on the second display unit 713 in the background.

Figure 10:
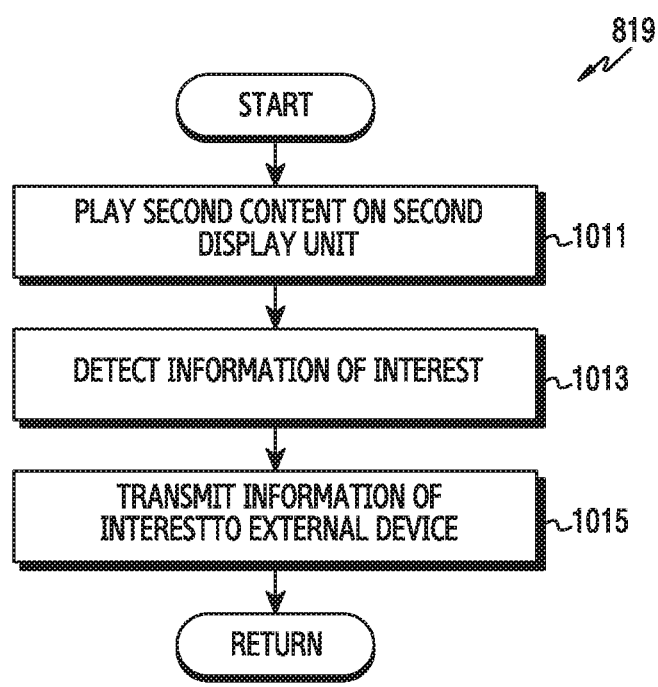
FIG. 10 is a flowchart illustrating an operation of playing second content on a second display unit in FIG. 8.

FIG. 10 is a flowchart illustrating an operation of playing second content on the second display unit 713 in FIG. 8.

Referring to FIG. 10, the controller 790 may play second content on the second display unit 713 in operation 1011. The controller 790 may detect object information on the object 1510 in operation 1013 while playing the second content on the second display unit 713. To this end, the controller 790 may analyze the object 1510, thereby detecting the object information. For example, the object information may include at least any one of item information on the item 1500, the approach time of the object 1510, and a feature of the object 1510. The approach time of the object 1510 may include approach start time and an approach retention period. The feature of the object 1510 may include at least any one of the age, gender, race, and personality of the object 1510 and may be detected from at least any one of image data on the object 1510, an audio signal of the object 1510, a movement of the object 1510, and the heat of the object 1510.

In operation 1015, the controller 790 may transmit the object information to an external device. Here, the external device may be the third electronic device 130 of the communication system (100 of FIG. 1). Then, the controller 790 may return to FIG. 8.

Figure 11:
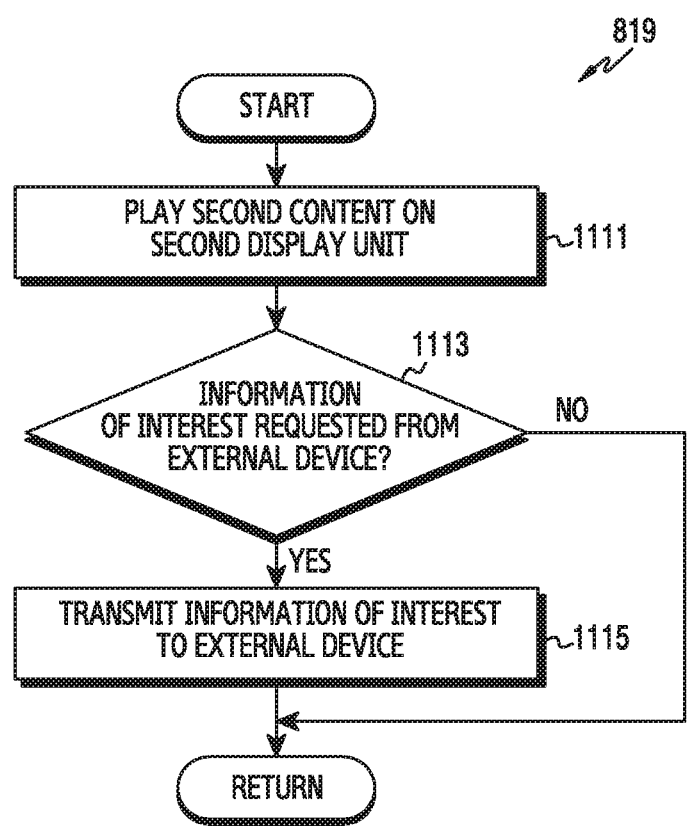
FIG. 11 is a flowchart illustrating an operation of playing second content on a second display unit in FIG. 8.

FIG. 11 is a flowchart illustrating an operation of playing second content on the second display unit 713 in FIG. 8.

Referring to FIG. 11, the controller 790 may play second content on the second display unit 713 in operation 1111. When information of interest is requested from an external device, the controller 790 may sense the information of interest in operation 1113. Here, the controller 790 may sense the request from the external device while playing the second content on the second display unit 713. Here, the external device may be the second electronic device 120 of the communication system (100 of FIG. 1). Here, the controller 790 may detect identification data on the external device from the request of the external device.

In operation 1115, the controller 790 may transmit the information of interest to the external device. For example, the information of interest may at least any one of item information on the item 1500 and guide information for guiding as to the download of the item information. Here, the controller 790 may transmit the information of interest using the identification data on the external device. Then, the controller 790 may return to FIG. 8.

Figure 12:
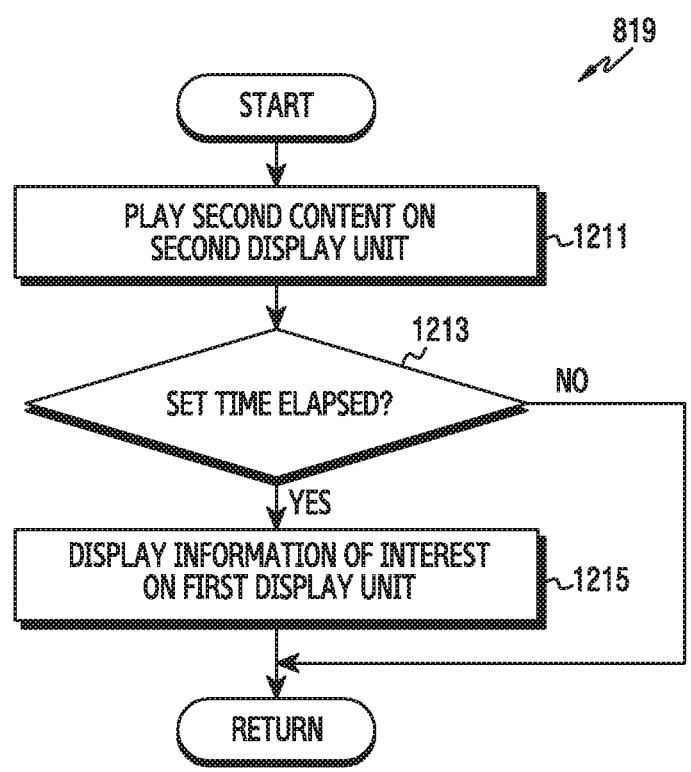
FIG. 12 is a flowchart illustrating an operation of playing second content on a second display unit in FIG. 8.

FIG. 12 is a flowchart illustrating an operation of playing second content on the second display unit 713 in FIG. 8.

Referring to FIG. 12, in operation 1211, the controller 790 may play second content on the second display unit 713. In operation 1213, the controller 790 may determine whether a preset time has elapsed. That is, the controller 790 may determine whether the second content has been played on the second display unit 713 for the preset time.

In operation 1215, the controller 790 may display information of interest on the first display unit 711. For example, the information of interest may include at least any one of item information on the item 1500 and guide information for guiding as to the download of the item information. To this end, the controller 790 may decrease the transparency of the first display unit 711. Here, the controller 790 may decrease the transparency of at least a portion of the first display unit 711. For example, the controller 790 may set the first display unit 711 to a semi-transparent state or an opaque state. The controller 790 may continuously play the second content on the second display unit 713. Alternatively, the controller 790 may stop playing the second content on the second display unit 713. Then, the controller 790 may turn off the second display unit 713. Thereafter, the controller 790 may return to FIG. 8.

Figure 19:
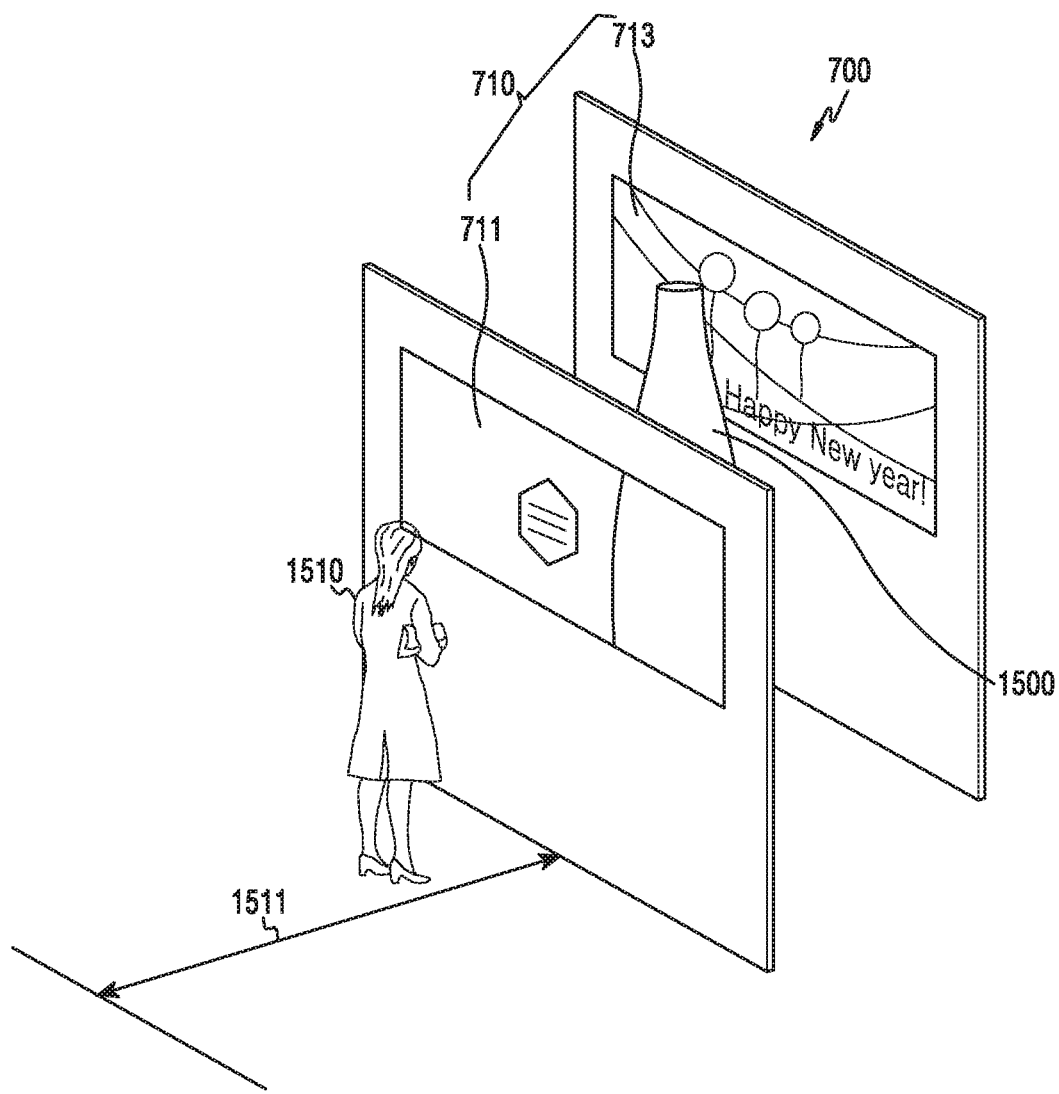

For example, as illustrated in FIG. 19, the controller 790 may display the information of interest on the first display unit 711. Here, while playing the second content on the second display unit 713, the controller 790 may set the first display unit 711 to a semi-transparent state. Accordingly, the object 1510 can view the information of interest on the first display unit 711 in the first direction of the first display unit 711. That is, the object 1510 can view the information of interest of the first display unit 711 with the second content on the second display unit 713 in the background. In addition, the object 1510 can view the item 1500 through the first display unit 711 with the second content on the second display unit 713 in the background. Here, the controller 790 may control the information of interest on the basis of input by the object 1510. Here, the controller 790 may move or remove the information of interest from the first display unit 711 and may call other information. The input by the object 1510 may include at least any one of a touch, a gesture, proximity, and hovering.

Figure 13:
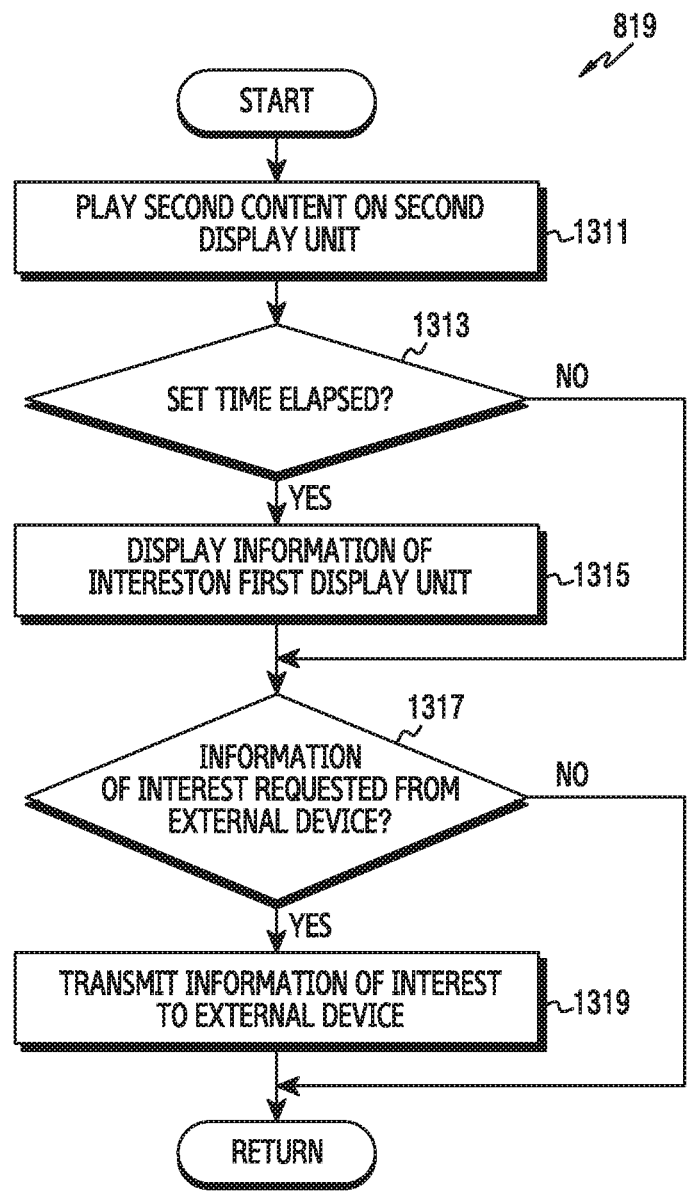
FIG. 13 is a flowchart illustrating an operation of playing second content on a second display unit in FIG. 8.

FIG. 13 is a flowchart illustrating an operation of playing second content on the second display unit 713 in FIG. 8.

Referring to FIG. 13, in operation 1311, the controller 790 may play second content on the second display unit 713. In operation 1313, the controller 790 may determine whether a preset time has elapsed. That is, the controller 790 may determine whether the second content has been played on the second display unit 713 for the preset time.

In operation 1315, the controller 790 may display information of interest on the first display unit 711. For example, the information of interest may include at least any one of item information on the item 1500 and guide information for guiding as to the download of the item information. To this end, the controller 790 may decrease the transparency of the first display unit 711. Here, the controller 790 may decrease the transparency of at least a portion of the first display unit 711. For example, the controller 790 may set the first display unit 711 to a semi-transparent state or an opaque state. The controller 790 may continuously play the second content on the second display unit 713. Alternatively, the controller 790 may stop playing the second content on the second display unit 713. Then, the controller 790 may turn off the second display unit 713.

For example, as illustrated in FIG. 19, the controller 790 may display the information of interest on the first display unit 711. Here, while playing the second content on the second display unit 713, the controller 790 may set the first display unit 711 to a semi-transparent state. Accordingly, the object 1510 can view the information of interest on the first display unit 711 in the first direction of the first display unit 711. That is, the object 1510 can view the information of interest of the first display unit 711 with the second content on the second display unit 713 in the background. In addition, the object 1510 can view the item 1500 through the first display unit 711 with the second content on the second display unit 713 in the background.

When the information of interest is requested from an external device, the controller 790 may sense the information of interest in operation 1317. Here, the external device may be the second electronic device 120 of the communication system (100 of FIG. 1). Further, the controller 790 may detect identification data on the external device from the request of the external device.

In operation 1319, the controller 790 may transmit the information of interest to the external device. Here, the controller 790 may transmit the information of interest using the identification data on the external device. Then, the controller 790 may return to FIG. 8.

Finally, when the object 1510 leaves, the controller 790 may sense that the object 1510 has left in operation 821. Here, when the object 1510 is not detected within the preset radius 1511 from the first display unit 711, the controller 790 may sense that the object 1510 has left. Then, the controller 790 may terminate the operation method of the electronic device 700. That is, the controller 790 may return to a state before the approach of the object 1510 is sensed. Here, the controller 790 may decrease the transparency of the transparent area 1610 of the first display unit 711.

Figure 14:
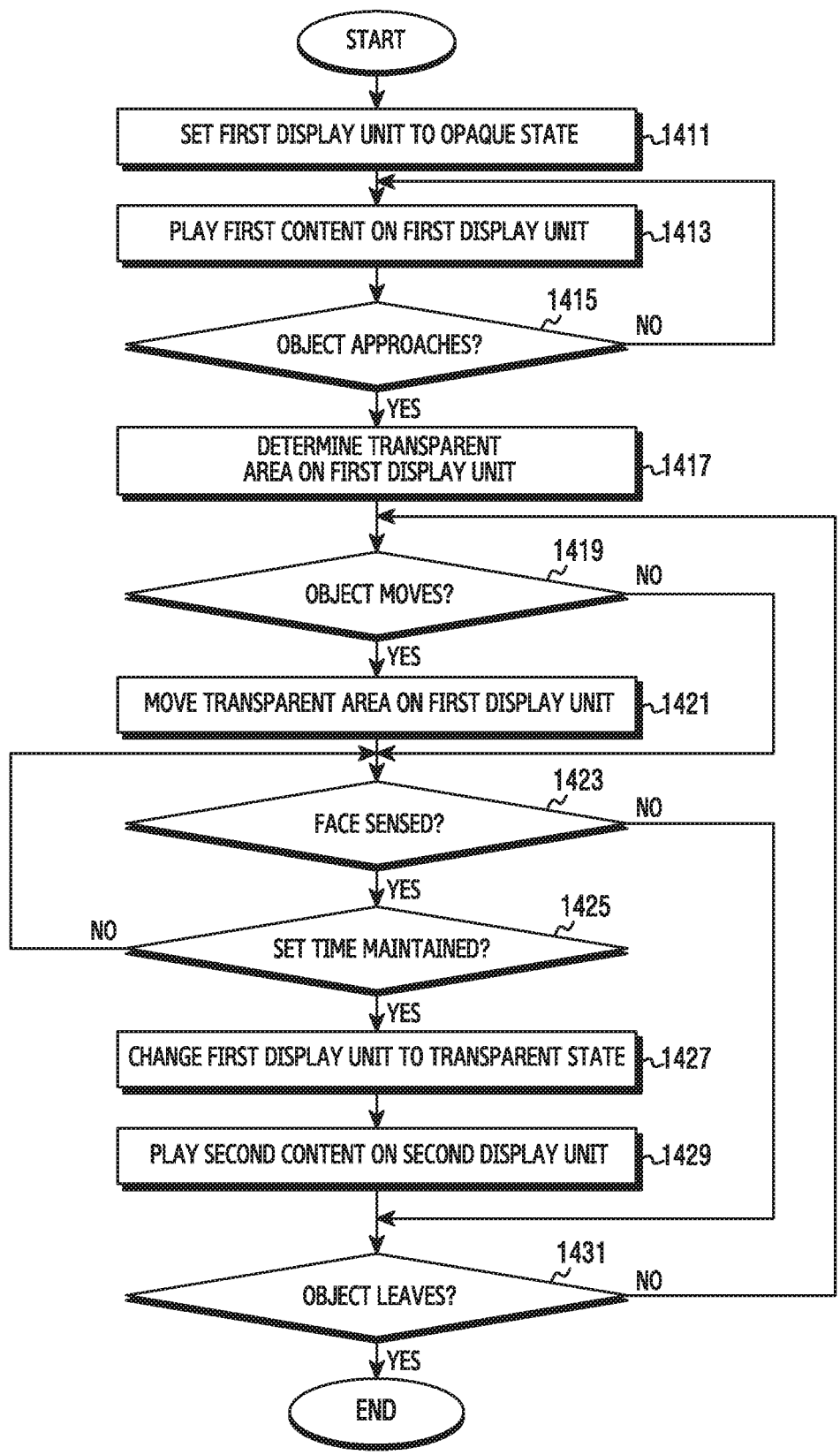
FIG. 14 is a flowchart illustrating a method for operating an electronic device according to an embodiment.

FIG. 14 is a flowchart illustrating a method for operating the electronic device 700 according to an embodiment.

Referring to FIG. 14, the method for operating the electronic device 700 according to an embodiment may start by the controller 790 setting the first display unit 711 to an opaque state in operation 1411. Here, the controller 790 may turn off the second display unit 713. In operation 1413, the controller 790 may display first content on the first display unit 711. For example, as illustrated in FIGS. 15A and 15B, the controller 790 may display the first content on the first display unit 711.

In operation 1415, when the object 1510 approaches, the controller 790 may sense that the object 1510 is approaching. Here, the controller 790 may detect the object 1510 within a preset radius 1511 from the first display unit 711. Here, the controller 790 may detect at least any one of the distance of the object 1510 and the location of the object 1510 corresponding to the first display unit 711. When the approach of the object 1510 is sensed in operation 1415, the controller 790 may determine a transparent area 1610 on the first display unit 711 in operation 1417. Here, the controller 790 may determine a portion of the first display unit 711 as the transparent area 1610 on the basis of the location of the object 1510. For example, as illustrated in FIG. 16, the controller 790 may determine a portion of the first display unit 711 as the transparent area 1610. Further, the controller 790 may change the transparent area 1610 to a transparent state.

When the object 1510 moves, the controller 790 may sense that the object 1510 is moving in operation 1419. Here, the controller 790 may continuously detect the object 1510 within the preset radius 1511 from the first display unit 711. For example, the object 1510 may move along the first display unit 711 within the preset radius 1511 from the first display unit 711. Here, at least any one of the distance of the object 1510 and the location of the object 1510 may be changed corresponding to the first display unit 711. When the movement of the object 1510 is sensed in operation 1419, the controller 790 may move the transparent area 1610 on the first display unit 711 in operation 1421. For example, as illustrated in FIG. 17, the controller 790 may move the transparent area 1610 on the first display unit 711.

In operation 1423, the controller 790 may sense a face. When the object 1510 is a user, the controller 790 may sense the face of the user. Here, the controller 790 may sense the face of the user from image data from the camera unit 730. When the face is sensed in operation 1423, the controller 790 may determine whether a preset time is maintained in operation 1425. That is, the controller 790 may determine whether the face is sensed for the preset time. For example, the controller 790 may determine whether at least any one of the face position, the direction of the face, and the position of the eyes is maintained for the preset time.

When it is determined that the preset time has been maintained in operation 1425, the controller 790 may change the entire area of the first display unit 711 to a transparent state in operation 1427. That is, when the face is sensed for the preset time, the controller 790 may change the entire area of the first display unit 711 to a transparent state. For example, when it is determined that at least any one of the face position, the direction of the face, and the position of the eyes is maintained for the preset time, the controller 790 may change the entire area of the first display unit 711 to a transparent state. Here, as illustrated in FIGS. 18A and 18B, the controller 790 may change the entire area of the first display unit 711 to a transparent state. In operation 1429, the controller 790 may play second content on the second display unit 713 in operation 1429. To this end, the controller 790 may turn on the second display unit 713. For example, as illustrated in FIGS. 18A and 18B, the controller 790 may play the second content on the second display unit 713.

Finally, when the object 1510 leaves, the controller 790 may sense that the object 1510 has left in operation 1431. Here, when the object 1510 is not detected within the preset radius 1511 from the first display unit 711, the controller 790 may sense that the object 1510 has left. Accordingly, the controller 790 may terminate the operation method of the electronic device 700. That is, the controller 790 may return to a state before the approach of the object 1510 is sensed.

Here, the controller 790 may decrease the transparency of the transparent area 1610 of the first display unit 711.

Meanwhile, when the movement of the object 1510 is not sensed in operation 1419, the controller 790 may perform operation 1423. Here, the controller 790 may sense the face in operation 1423 while maintaining the transparent area on the first display unit 711. That is, the controller 790 may sense the face without changing the location of the transparent area 1610 on the first display unit 711.

Meanwhile, when it is determined that the preset time has not been maintained in operation 1425, the controller 790 may return to operation 1423. Accordingly, the controller 790 may continuously sense the face in operation 1423. That is, the controller 790 may continuously sense the face of the user from the image data from the camera unit 730.

When the face is not sensed in operation 1423, the controller 790 may perform operation 1431.

According to various embodiments, the electronic device 700 may provide various interactions using the first display unit 711 having variable transparency. That is, the electronic device 700 may respond to the object 1510 through the first display unit 711 and may provide various interactions. In this manner, the electronic device 700 may efficiently attract people's attention. In addition, the electronic device 700 may highlight the item 1500 through the second display unit 713. Moreover, the electronic device 700 may provide the information of interest for the object 1510. Accordingly, the electronic device 110 may effectively display the item 1500.

Figure 20:
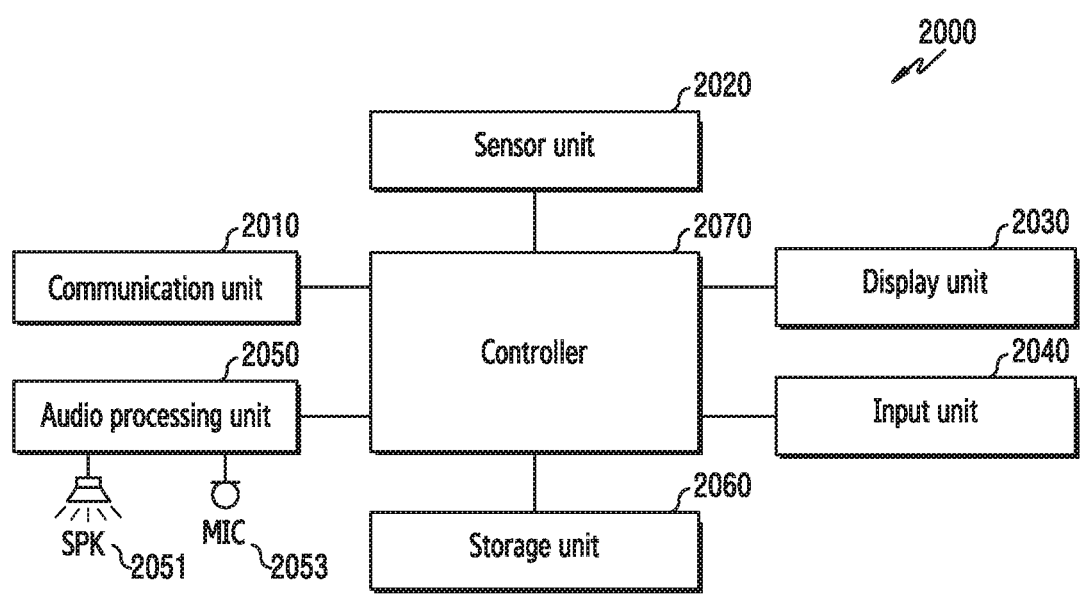
FIG. 20 is a block diagram illustrating an electronic device according to various embodiments.

FIG. 20 is a block diagram illustrating an electronic device 2000 according to various embodiments.

Referring to FIG. 20, the electronic device 700 according to various embodiments may include a communication unit 2010, a sensor unit 2020, a display unit 2030, an input unit 2040, an audio processing unit 2050, a storage unit 2060, and a storage unit 2070. According to various embodiments, the electronic device 200 may be a second electronic device (120 in FIG. 1) of a communication system (100 in FIG. 1).

The communication unit 2010 may perform communication in the electronic device 2000. Here, the communication unit 2010 may communicate with an external device using various communication methods. For example, the communication unit 2010 may perform communication in a wired or wireless manner. To this end, the communication unit 2010 may include at least one antenna. The communication unit 2010 may be connected to at least any one of a mobile communication network and a data communication network. Further, the communication unit 2010 may perform near-field communication. For example, the external device may include at least any one of an electronic device, a base station, a server, and a satellite. According to various embodiments, the external device may include at least any one of a first electronic device (110 in FIG. 1) and a third electronic device (130 in FIG. 1) in the communication system (100 in FIG. 1). In addition, the communication methods may include Long-Term Evolution (LTE), Wideband Code Division Multiple Access (WCDMA), Global System for Mobile Communications (GSM), Wireless Fidelity (Wi-Fi), Wireless Local Area Network (WLAN), Bluetooth, and Near-Field Communication (NFC).

The sensor unit 2020 may measure the peripheral physical quantities of the electronic device 2000. Further, the sensor unit 2020 may sense the state of the electronic device 2000. That is, the sensor unit 2020 may detect a physical signal. The sensor unit 2020 may convert a physical signal into an electrical signal. The sensor unit 2020 may include at least one sensor. For example, the sensor unit 2020 may include at least any one of a gesture sensor, a proximity sensor, an illuminance sensor, a temperature-humidity sensor, a thermal sensor, and a motion sensor.

The display unit 2030 may output display data in the electronic device 2000. For example, the display unit 2030 may include a Liquid Crystal Display (LCD), a Light Emitting Diode (LED) display, an Organic Light Emitting Diode (OLED) display, an Active Matrix Organic Light Emitting Diode (AMOLED) display, a Micro-Electro-Mechanical Systems (MEMS) display, and an electronic paper display.

The input unit 2040 may generate input data in the electronic device 2000. Here, the input unit 2040 may include at least one input tool. For example, the input unit 2040 may include at least any one of a key pad, a dome switch, a physical button, a touch panel, and a jog shuttle. The input unit 2040 may be coupled to the display unit 2030 to be configured as a touch screen.

The audio processing unit 2050 may process an audio signal in the electronic device 2000. In this case, the audio processing unit 2050 may include a speaker (SPK) 2051 and a microphone (MIC) 2053. That is, the audio processing unit 2050 may play the audio signal through the speaker 2051. The audio processing unit 2050 may collect the audio signal through the microphone 2053.

The storage unit 2060 may store operation programs of the electronic device 2000. The storage unit 2060 may store data generated during the execution of the programs. For example, the storage unit 2060 may include at least any one of an internal memory and an external memory. The internal memory may include at least any one of a volatile memory (e.g., a DRAM, a SRAM, and a SDRAM,) and a nonvolatile memory (e.g., a One-Time Programmable ROM (OTPROM), a PROM, an EPROM, an EEPROM, a mask ROM, a flash ROM, a flash memory, a hard drive, or a Solid-State Drive (SSD)). The external memory may include at least any one of a flash drive, a Compact Flash (CF), a Secure Digital (SD), a micro-SD, a mini-SD, an extreme digital (xD), a Multi-Media Card (MMC), and a memory stick.

The controller 2070 may control the overall operation in the electronic device 2000. Here, the controller 2070 may perform various functions. To this end, the controller 2070 may control the components of the electronic device 2000. The controller 2070 may receive and process a command or data from the components of the electronic device 2000.

According to various embodiments, the controller 2070 may sense an active signal. Here, when the electronic device 2000 is turned on, the controller 2070 may sense the active signal regardless of the current state. For example, the controller 2070 can sense the active signal in a normal-power state and can also sense the active signal in a low-power state. Further, the controller 2070 can sense the active signal with the display unit 2030 tuned on and can also sense the active signal with the display unit 2030 tuned off.

For example, the active signal may include at least any one of an acoustic signal and a movement signal. The acoustic signal may be generated from the microphone 2053 when the electronic device 2000 is tapped, and the controller 2070 may sense the acoustic signal through the audio processing unit 2050 and the microphone 2053. The controller 2070 may detect the acoustic signal as an active signal by comparing the acoustic signal with a preset active condition. The movement signal may be generated from the sensor unit 2020 according to the movement of the electronic device 2000, and the controller 2070 may sense the movement signal through the sensor unit 2020. The controller 2070 may the movement signal as an active signal by comparing the movement signal with a preset movement condition.

According to various embodiments, the controller 2070 may receive a reference signal from an external device. Here, the external device may be a first electronic device (110 in FIG. 1) of the communication system (100 in FIG. 1). For example, the reference signal may include at least any one of unique identification information and location information on the external device. That is, the controller 2070 may receive the reference signal in response to the active signal. Further, the controller 2070 may receive the reference signal through the communication unit 2010.

For example, the controller 2070 may receive the reference signal through near-field communication. To this end, when the near-field communication is deactivated, the controller 2070 may activate the near-field communication in response to the active signal. Then, upon receiving the reference signal, the controller 2070 may deactivate the near-field communication. When the near-field communication is activated, the controller 2070 may maintain the near-field communication even though having received the reference signal. For example, the external device may periodically emit the reference signal, and the controller 2070 may receive the reference signal. Alternatively, the controller 2070 may request the reference signal from the external device and may receive the reference signal from the external device in response.

According to various embodiments, the controller 2070 may receive information of interest on the basis of the reference signal. For example, the information of interest may include at least any one of item information on a predetermined item 1500 and guide information for guiding as to the download of the item information. The controller 2070 may receive the information of interest from an external device. Here, the external device may include at least any one of the first electronic device (110 in FIG. 1) and a third electronic device (130 in FIG. 1) of the communication system (100 in FIG. 1). For example, the controller 2070 may authenticate the reference signal to obtain an authentication result. Alternatively, the controller 2070 may request the external device to authenticate the reference signal and may receive an authentication result from the external device. Then, the controller 2070 may request the information of interest from the external device on the basis of the authentication result and may receive the information of interest from the external device in response. The controller 2070 may display the information of interest on the display unit 2030.

Figure 21:
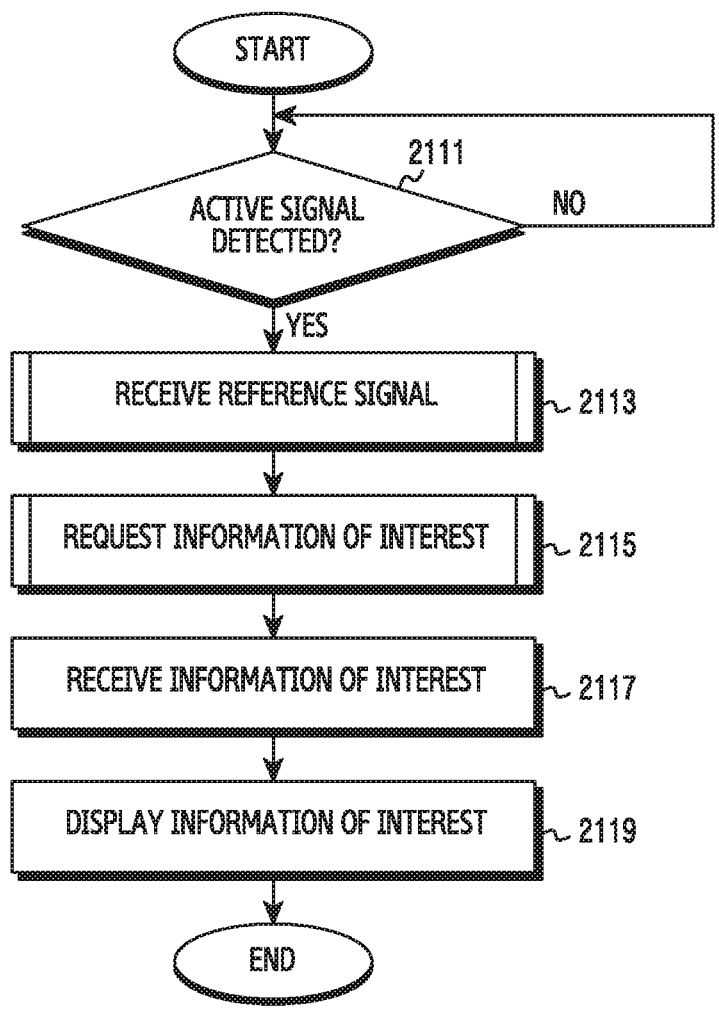
FIG. 21 is a flowchart illustrating a method for operating an electronic device according to various embodiments

FIG. 21 is a flowchart illustrating a method for operating the electronic device 2000 according to various embodiments. FIGS. 24, 25, 26, 27, 28, and 29 illustrate examples of the method for operating the electronic device 2000 according to various embodiments.

Referring to FIG. 21, the method for operating the electronic device 2000 according to various embodiments may start by the controller 2070 detecting an active signal in operation 2111. Here, when the electronic device 2000 is turned on, the controller 2070 may detect the active signal. For example, the controller 2070 can sense the active signal in a normal-power state and can also sense the active signal in a low-power state. Further, the controller 2070 can sense the active signal in a display-on state and can also sense the active signal in a display-off state. For example, the active signal may include at least any one of an acoustic signal and a movement signal.

Figure 24:
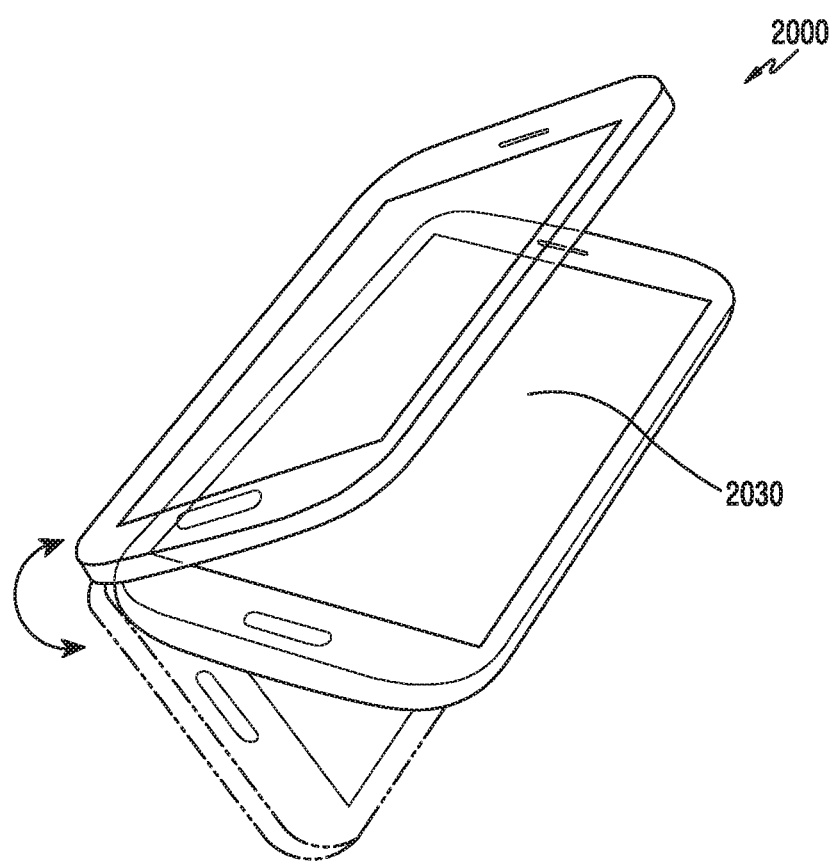
FIGS. 24, 25, 26, 27, 28, and 29 illustrate examples of a method for operating an electronic device according to various embodiments.

According to an embodiment, the controller 2070 may sense a movement signal through the sensor unit 2020. For example, as illustrated in FIG. 24, when the movement of the electronic device 2000 occurs, the sensor unit 2020 may sense the movement and may generate a movement signal. Accordingly, the controller 2070 may detect the movement signal from the sensor unit 2020. The controller 2070 may compare the movement signal with a preset movement condition. For example, the movement condition may be set to at least any one of a movement angle, a movement speed, and a movement time. When the movement signal corresponds to the movement condition, the controller 2070 may detect the movement signal as an active signal. When the movement signal does not correspond to the movement condition, the controller 2070 may ignore the movement signal or may perform a predetermined function corresponding to the movement signal.

Figure 25:
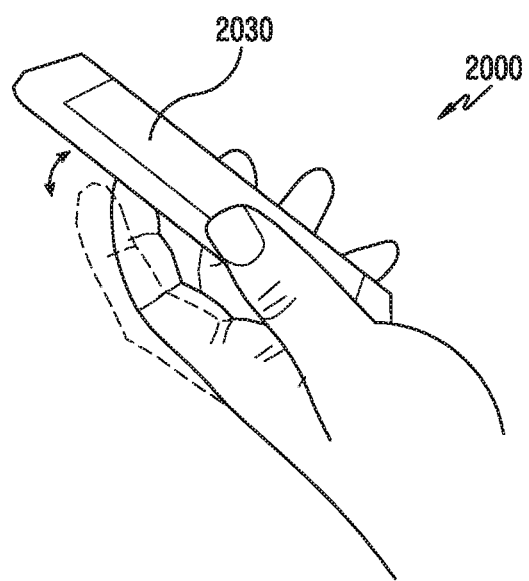
Figure 26:
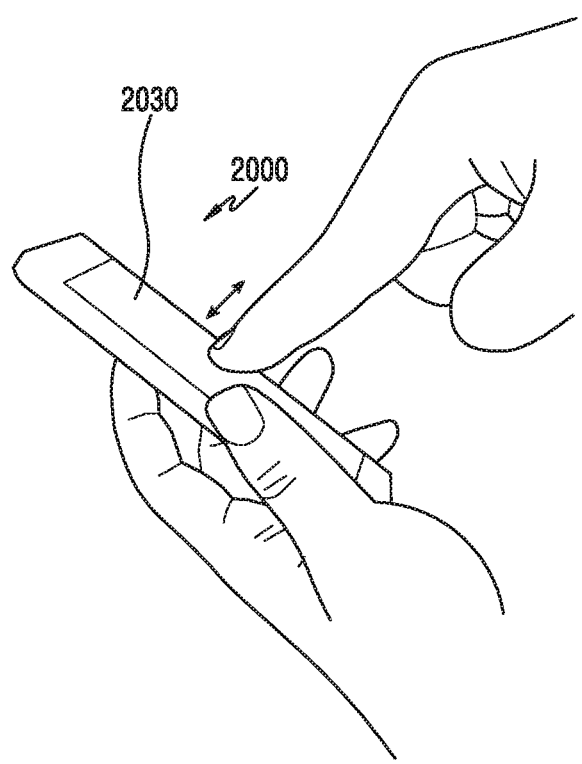

According to another embodiment, the controller 2070 may sense an acoustic signal through the microphone 2053 and the audio processing unit 2050. For example, as illustrated in FIG. 25, when a tap occur at the back of the electronic device 2000, the microphone 2053 and the audio processing unit 2050 may sense the tap and may generate an acoustic signal. Alternatively, as illustrated in FIG. 26, when a tap occur at the front of the electronic device 2000, the microphone 2053 and the audio processing unit 2050 may sense the tap and may generate an acoustic signal. Accordingly, the controller 2070 may detect the acoustic signal from the audio processing unit 2050. The controller 2070 may compare the acoustic signal with a preset active condition. For example, the active condition may be set to at least any one of a tap count, a tap interval, a tap speed, and a tap time. When the acoustic signal corresponds to the active condition, the controller 2070 may detect the acoustic signal as an active signal. When the acoustic signal does not correspond to the active condition, the controller 2070 may ignore the acoustic signal or may perform a predetermined function corresponding to the acoustic signal.

When the active signal is detected in operation 2111, the controller 2070 may receive a reference signal from an external device in operation 2113. Here, the external device may be a first electronic device (110 in FIG. 1) of a communication system (100 in FIG. 1). For example, the reference signal may include at least any one of unique identification information and location information on the external device. That is, the controller 2070 may receive the reference signal in response to the active signal. Further, the controller 2070 may receive the reference signal through the communication unit 2010. For example, the controller 2070 may receive the reference signal through near-field communication.

Figure 22:
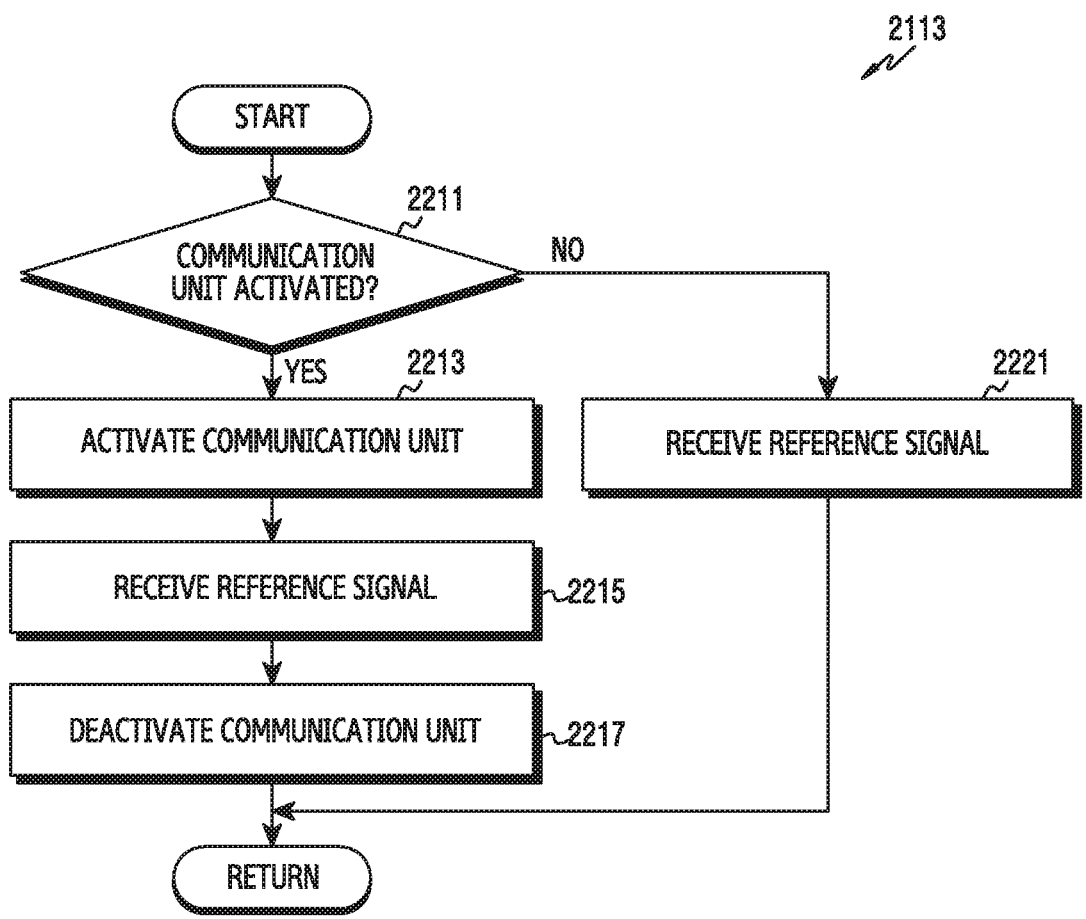
FIG. 22 is a flowchart illustrating an operation of receiving a reference signal in FIG. 21.

FIG. 22 is a flowchart illustrating an operation of receiving a reference signal in FIG. 21.

Referring to FIG. 22, the controller 2070 may determine whether the activation of the communication unit 2010 is needed in operation 2211. That is, the controller 2070 may determine whether the communication unit 2010 is activated. For example, the controller 2070 may determine whether near-field communication is activated.

When it is determined that the activation of the communication unit 2010 is needed in operation 2211, the controller 2070 may activate the communication unit 2010 in operation 2213. That is, the communication unit 2010 is deactivated, the controller 2070 may activate the communication unit 2010. For example, when near-field communication is deactivated, the controller 2070 may activate near-field communication. In operation 2215, the controller 2070 may receive a reference signal through the communication unit 2010. For example, the controller 2070 may receive a reference signal through near-field communication. Here, an external device may periodically emit the reference signal, and the controller 2070 may receive the reference signal. Alternatively, the controller 2070 may request the reference signal from the external device and may receive the reference signal from the external device in response. For example, the reference signal may include at least any one of unique identification information and location information on the external device.

In operation 2217, the controller 2070 may deactivate the communication unit 2010. For example, the controller 2070 may deactivate near-field communication. Subsequently, the controller 2070 may return to FIG. 21.

When it is determined that the activation of the communication unit 2010 is not needed in operation 2221, the controller 2070 may receive a reference signal in operation 2221. That is, when the communication unit 2010 is activated, the controller 2070 may receive the reference signal through the communication unit 2010. For example, when near-field communication is activated, the controller 2070 may receive a reference signal through near-field communication. Here, an external device may periodically emit the reference signal, and the controller 2070 may receive the reference signal. Alternatively, the controller 2070 may request the reference signal from the external device and may receive the reference signal from the external device in response. For example, the reference signal may include at least any one of unique identification information and location information on the external device. Subsequently, the controller 2070 may return to FIG. 21. That is, even though having received the reference signal, the controller 2070 may not deactivate the communication unit 2010. For example, the controller 2070 may maintain near-field communication even though having received the reference signal.

In operation 2115, the controller 2070 may request information of interest. Here, the controller 2070 may request the information of interest from an external device or another external device. Here, the external device may be a first electronic device 110 in a communication system (100 in FIG. 1), and the other external device may be a third electronic device 130 in the communication system (100 in FIG. 1). Here, the controller 2070 may request the information of interest on the basis of the reference signal. For example, the controller 2070 may authenticate the reference signal and may obtain an authentication result. Alternatively, the controller 2070 may request the external device or the other external device to authenticate the reference signal and may receive an authentication result from the external device or the other external device. Then, the controller 2070 may request the information of interest from the external device or the other external device on the basis of the authentication result.

Figure 23:
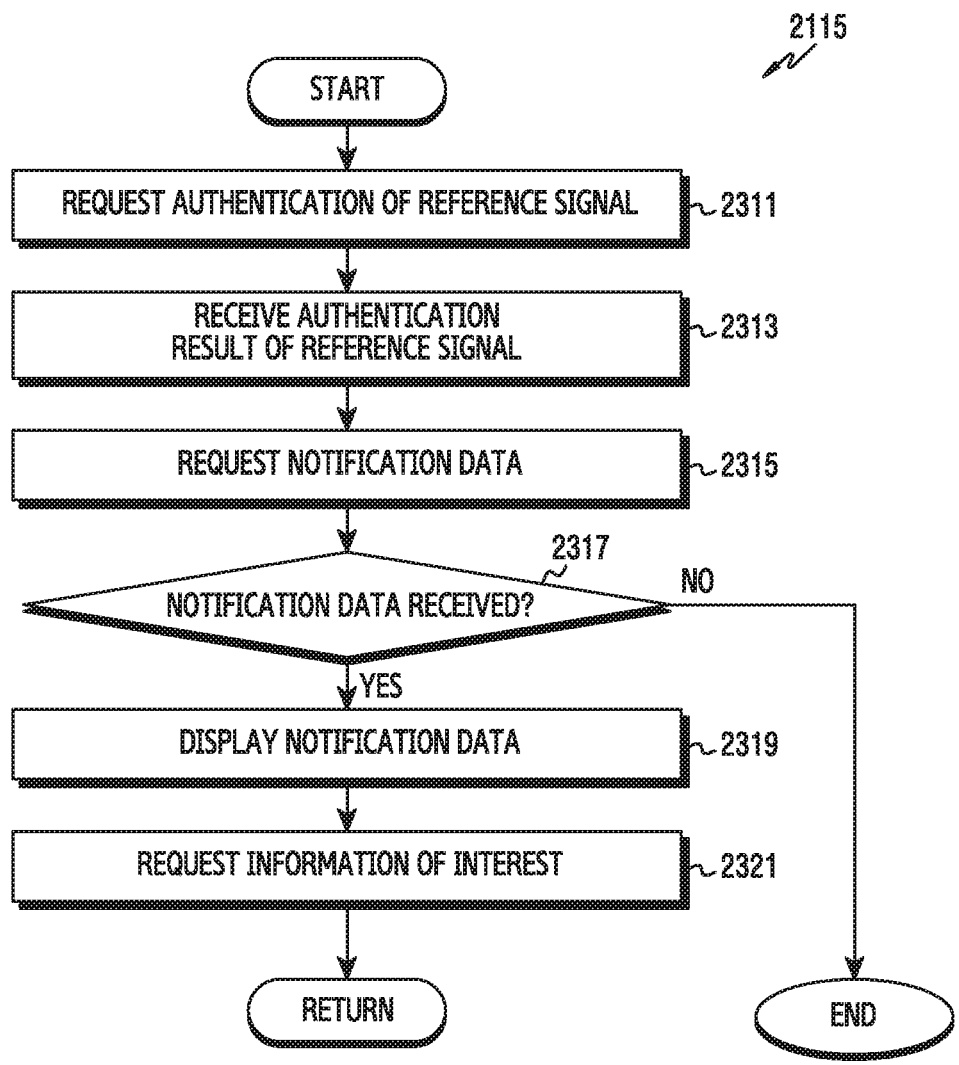
FIG. 23 is a flowchart illustrating an operation of requesting information of interest in FIG. 21.

FIG. 23 is a flowchart illustrating an operation of requesting information of interest in FIG. 21.

Referring to FIG. 23, the controller 2070 may request the authentication of a reference signal in operation 2311. Here, the controller 2070 may request an external device or another external device to authenticate the reference signal. To this end, the controller 2070 may transmit at least any one of unique identification information on the reference signal and location information on the external device. In operation 2113, the controller 2070 may receive an authentication result of the reference signal. Here, the controller 2070 may receive the authentication result of the reference signal from the external device or the other external device. The authentication result may indicate either authentication success or authentication failure.

In operation 2315, the controller 2070 may request notification data. Here, the controller 2070 may request the notification data from the external device or the other external device. To this end, the controller 2070 may transmit, along with the authentication result of the reference signal, at least any one of the unique identification information on the reference signal and the location information on the external device. Alternatively, the controller 2070 may transmit at least any one of the unique identification information on the reference signal and the location information on the external device.

Figure 27:
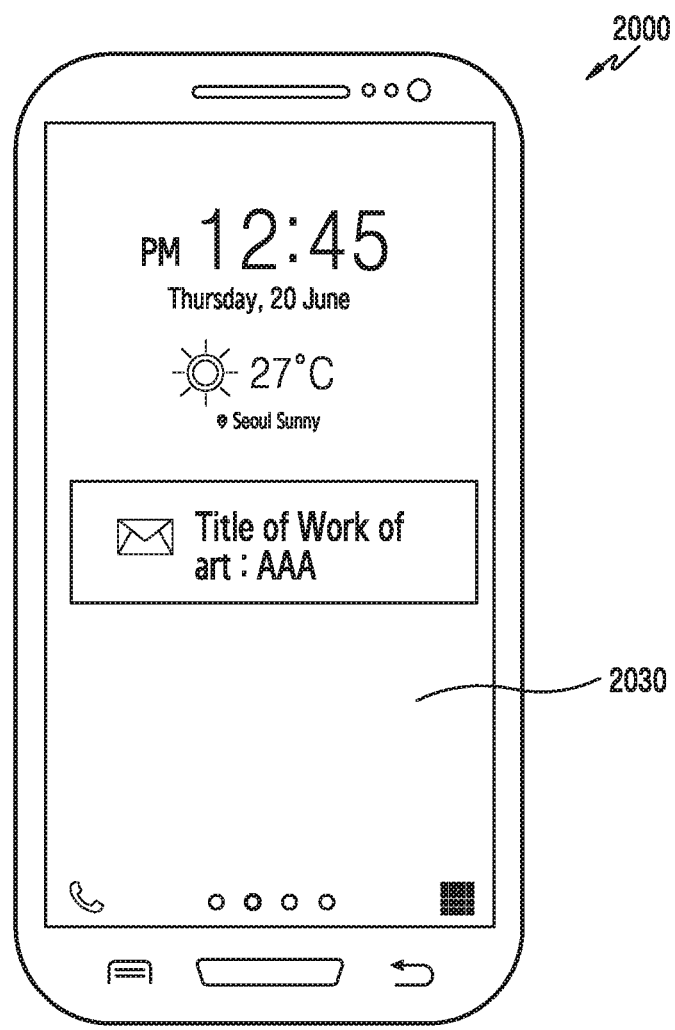

When the notification data is received, the controller 2070 may sense the notification data in operation 2317. Here, when the authentication result of the reference signal corresponds to authentication success, the controller 2070 may receive the notification data from the external device or the other external device. For example, the notification data may include at least any one of an icon, a thumbnail, text, and address information on information of interest. In operation 2319, the controller 2070 may display the notification data. Here, the controller 2070 may display the notification data on the display unit 2030. For example, as illustrated in FIG. 27, the controller 2070 may display the notification data.

In operation 2321, the controller 2070 may request information of interest. Here, the controller 2070 may request the information of interest from the external device or the other external device. The controller 2070 may request the information of interest on the basis of the notification data. For example, when the notification data is selected, the controller 2070 may request the information of interest. Here, the controller 2070 may request the information of interest using the address information of the notification data. Subsequently, the controller 2070 may return to FIG. 21.

In operation 2117, the controller 2070 may receive the information of interest. For example, the information of interest may include at least any one of item information on a predetermined item 1500 and guide information for guiding as to the download of the item information. Here, the controller 2070 may receive the information of interest from the external device or the other external device.

Figure 28:
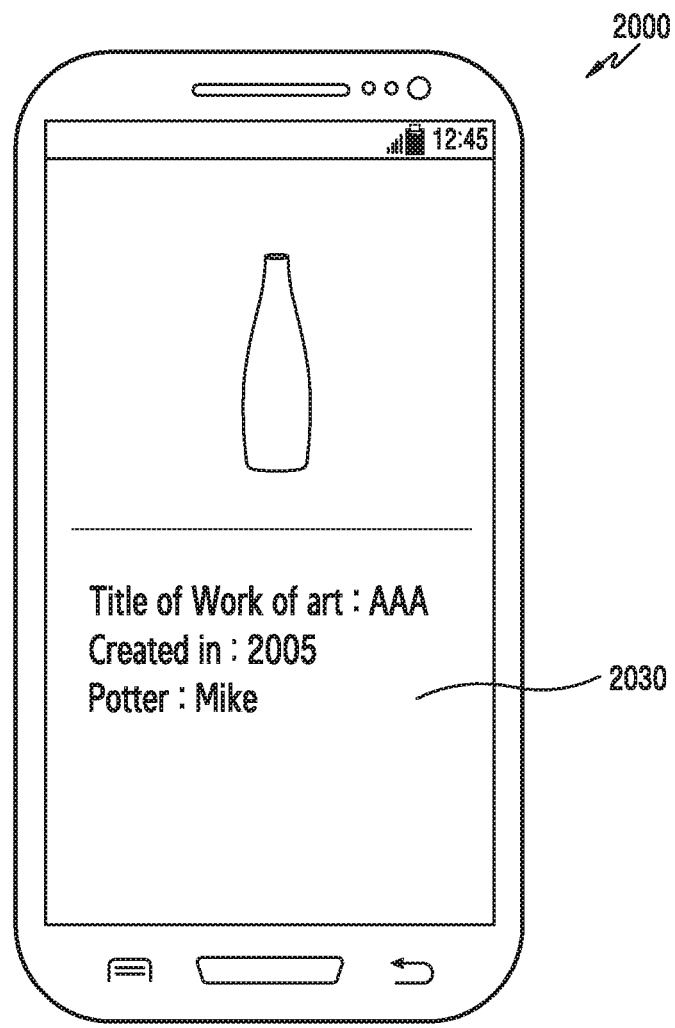
Figure 29:
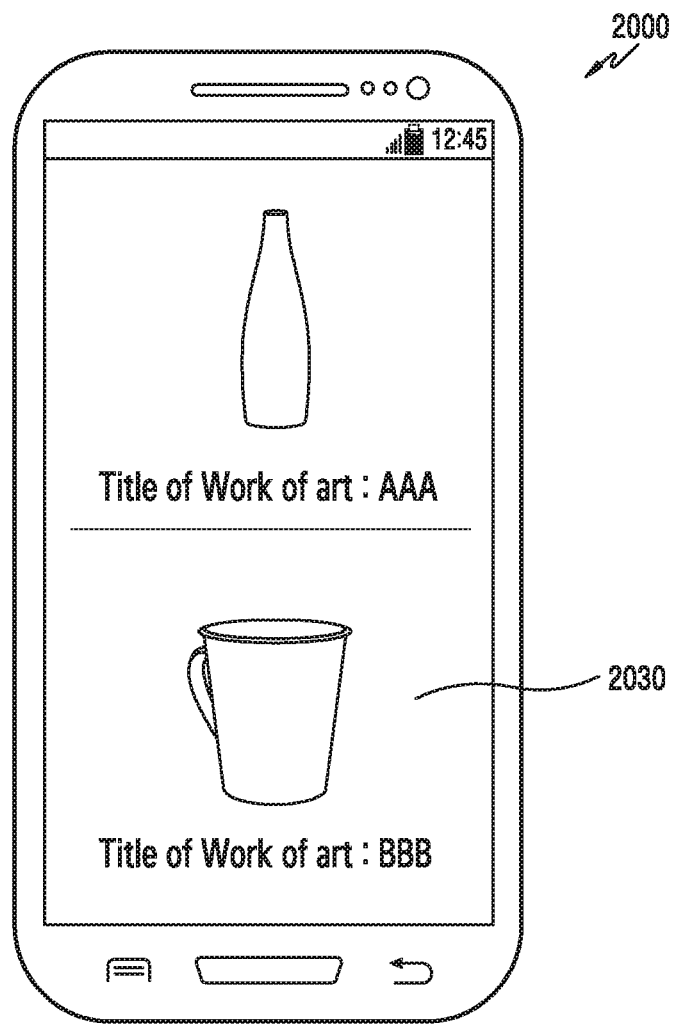

Finally, in operation 2119, the controller 2070 may display the information of interest. Here, the controller 2070 may display the information of interest on the display unit 2030. For example, as illustrated in FIG. 28 or FIG. 29, the controller 2070 may display the information of interest. That is, as illustrated in FIG. 28, the controller 2070 may display item information on one item 1500. Further, as illustrated in FIG. 29, the controller 2070 may display a list of pieces of item information on a plurality of items 1500. Here, as illustrated in FIG. 28, the controller 2070 may display item information on any one of the plurality of items 1500 on the basis of a user selection. Then, the operation method of the electronic device 2000 may be terminated.

According to various embodiments, the electronic device 2000 may receive the reference signal, not unconditionally but in response to an active signal. That is, the electronic device 2000 may receive the reference signal as needed. Accordingly, the power consumption of the electronic device 2000 may be reduced. Further, the electronic device 2000 does not need to perform an operation of changing settings to receive the reference signal. Accordingly, the electronic device 2000 may easily receive the information of interest. Thus, the operation efficiency of the electronic device 2000 may be improved, and the electronic device 2000 may detect the active signal from the user's simple operation. As a result, the convenience of the user using the electronic device 2000 may be improved.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

The invention claimed is:

1. An operation method of an electronic device, the method comprising:
    displaying first content on a first display unit having variable transparency;
    sensing an object corresponding to the first display unit;
    adjusting the transparency in at least a portion of the first display unit based on the object; and
    displaying second content on a second display unit that is spaced apart from the first display unit,
    wherein adjusting the transparency comprises increasing the transparency in at least the portion of the first display unit based on an approach of the object,
    wherein increasing the transparency comprises:
        determining the portion of the first display unit as a transparent area based on a location of the object; and
        increasing the transparency in the transparent area, and
    wherein adjusting the transparency further comprises moving the transparent area on the first display unit according to a movement of the object.

2. The method of claim 1, wherein displaying the second content is performed when the transparency is increased in an entire area of the first display unit.

3. The method of claim 2, wherein the object is a user, and adjusting the transparency comprises increasing the transparency in the entire area of the first display unit when a face of the user is sensed for a preset time.

4. The method of claim 1, further comprising displaying predetermined information of interest on the first display unit.

5. The method of claim 1, further comprising transmitting predetermined information of interest to an external device.

6. The method of claim 5, wherein transmitting the information of interest comprises transmitting the information of interest to the external device in response to a request from the external device.

7. The method of claim 1, further comprising:
    sensing that the object leaves; and
    decreasing the transparency in at least the portion of the first display unit.

8. The method of claim 1, further comprising:
    detecting object information on the object; and
    transmitting the object information to an external device.

9. The method of claim 1, wherein sensing the object comprises at least one of:
    capturing an image of the object;
    sensing an audio signal from the object;
    sensing a movement of the object; and
    sensing a heat of the object.

10. The method of claim 1, wherein the second display unit is disposed behind the first display unit.

11. The method of claim 1, wherein sensing the object comprises sensing the object within a preset radius from the first display unit.

12. An electronic device, comprising:
a first display unit having variable transparency;
a second display unit that is spaced apart from the first display unit; and
a controller operatively connected with the first display unit and the second display unit,
wherein the controller is configured to:
displaying first content on the first display unit;
sense an object corresponding to the first display unit;
adjust the transparency in at least a portion of the first display unit based on the object; and
displaying second content on the second display unit, and
wherein the controller is further configured to:
increase the transparency in at least the portion of the first display unit based on an approach of the object, and
move a transparent area on the first display unit according to a movement of the object.

13. The electronic device of claim 12, wherein the controller is further configured to:
display predetermined information of interest on the first display unit, or
transmit predetermined information of interest to an external device.

14. The electronic device of claim 12, wherein the controller is further configured to:
sense that the object leaves; and
decrease the transparency in at least the portion of the first display unit.

15. The electronic device of claim 12, wherein the second display unit is disposed behind the first display unit.

16. The electronic device of claim 12, wherein the controller is further configured to:
sense the object within a preset radius from the first display unit.

* * * * *